US012771555B2

(12) United States Patent
Fukuda et al.

(10) Patent No.: US 12,771,555 B2
(45) Date of Patent: Oct. 20, 2026

(54) DIGITAL SIGNATURE SYSTEM AND METHOD

(71) Applicant: NEC Corporation, Tokyo (JP)

(72) Inventors: Haruna Fukuda, Tokyo (JP); Toshiyuki Isshiki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 111 days.

(21) Appl. No.: 18/748,224

(22) Filed: Jun. 20, 2024

(65) Prior Publication Data

US 2024/0430100 A1 Dec. 26, 2024

(30) Foreign Application Priority Data

Jun. 22, 2023 (JP) ................................ 2023-102630

(51) Int. Cl.
*H04L 9/32* (2006.01)
*H04L 9/40* (2022.01)

(52) U.S. Cl.
CPC ........ *H04L 9/3247* (2013.01); *H04L 63/0861* (2013.01)

(58) Field of Classification Search
None
See application file for complete search history.

(56) References Cited

U.S. PATENT DOCUMENTS 5,825,880 A * 10/1998 Sudia ...................... G06F 21/64 713/180
9,565,023 B2 * 2/2017 Takahashi ............... H04L 9/006
11,558,199 B1 * 1/2023 Griffin .................... G06F 21/64
11,917,074 B2 * 2/2024 Hong .................... H04L 9/0894
2014/0019766 A1 1/2014 Takahashi et al.
2015/0270977 A1 * 9/2015 Martins ..................... H04L 9/30 380/30

(Continued)

FOREIGN PATENT DOCUMENTS

JP 2003-229845 A 8/2003
JP 2004-193684 A 7/2004

(Continued)

OTHER PUBLICATIONS

Menezes et al. (Alfred J. Menezes, Paul C. van Oorschot, Scott A. Vanstone, "Handbook of applied cryptography", 1997, ISBN: 0849385237, p. 385-488) (Year: 1997).*

(Continued)

*Primary Examiner* — Piotr Poltorak
(74) *Attorney, Agent, or Firm* — Sughrue Mion, PLLC

(57) ABSTRACT

A digital signature system includes a first and second signature generation apparatuses. The second signature generation apparatus receives a first parameter generated using at least first biometric information to stores the first parameter in a storage. The first signature generation apparatus generates a second parameter using at least second biometric information for transmission to the second signature generation apparatus, which generates a second signature for a message to be signed using the first parameter and the second parameter for transmission to the first signature generation apparatus. The first signature generation apparatus generates a first signature for the message based on at least the second signature and outputs the first signature.

17 Claims, 19 Drawing Sheets

100

(56) References Cited

U.S. PATENT DOCUMENTS

| | | | | |
|---|---|---|---|---|
| 2016/0094348 | A1* | 3/2016 | Takahashi | H04L 9/3231<br>713/176 |
| 2019/0042716 | A1* | 2/2019 | Kaga | H04L 9/3231 |
| 2021/0336792 | A1* | 10/2021 | Agrawal | H04L 9/30 |
| 2022/0038291 | A1* | 2/2022 | Hong | H04L 9/3231 |
| 2022/0131698 | A1* | 4/2022 | Badrinarayanan | H04L 9/3255 |
| 2022/0405369 | A1 | 12/2022 | Takahashi | |
| 2024/0080202 | A1* | 3/2024 | Sirdey | H04L 9/3234 |

FOREIGN PATENT DOCUMENTS

| | | | | |
|---|---|---|---|---|
| JP | 2005-045622 | A | 2/2005 | |
| JP | 5707311 | B2 | 4/2015 | |
| JP | 5907830 | B2 | 4/2016 | |
| JP | 6096893 | B2 | 3/2017 | |
| JP | 2021-508427 | A | 3/2021 | |
| JP | 2021-087167 | A | 6/2021 | |
| WO | WO-2020070499 | A1 * | 4/2020 | H04L 9/3226 |

OTHER PUBLICATIONS

Gomez-Barrero: Marta Gomez-Barrero et al., “Variable-Length Template Protection Based on Homomorphic Encryption With Application to Signature Biometrics”, IEEE 978-1-4673-9448—Feb. 16, 2016 (Year: 2016).*

Gomze-Barrero 2: Marta Gomez-Barrero et al., “Implementation of Fixed-Length Template Protection Based on Homomorphic Encryption with Application to Signature Biometrics”, IEEE 978-1-5090-1437—Aug. 16, 2016 (Year: 2016).*

Antonio Nicolosi, et al., “Proactive Two-Party Signings for User Authentication,” Conference: Proceedings of the Network and Distributed System Security Symposium, NDSS 2003, San Diego, California, USA.

David Derler, et al., “Key-Homomorphic Signings: Definitions and Applications to Multiparty Signings and Non-Interactive Zero-Knowledge,” Designs, Codes and Cryptography 87, 1372-1413, 2019.

* cited by examiner

DIGITAL SIGNATURE SYSTEM AND METHOD

CROSS REFERENCE TO RELATED APPLICATIONS

This application is based upon and claims the benefit of the priority of Japanese patent application No. 2023-102630, filed on Jun. 22, 2023, the disclosure of which is incorporated herein in its entirety by reference thereto. The present invention relates to a digital signature system, a method and a non-transitory medium.

FIELD

Background

Digital signature is a technology which enables to verify a creator of an electronic document and check that the document has not been altered after creation thereof.

<Algorithm of Digital Signature>

The following outlines one of typical algorithms of digital signature.

Key Generation:

Key generation algorithm KeyGen( ) generates a pair of a signing key (secret key) sk and a verification key (public key) vk.

$$(sk, vk) \leftarrow KeyGen(1^{\kappa}) \tag{1}$$

where κ is a security parameter.

Instead of the key generation algorithm Key Gen( ) directly receiving a security parameter, reception of public parameters which a setup algorithm has generated from the security parameter, may be accompanied with generating a pair of the signing key (secret key) sk and the verification key (public key) vk, in some cases.

Signing:

Generating a signature o for a message (document) M with the signing key sk. That is, the signature σ is generated using the signing key (secret key) sk for a message M to be signed or a hash value (message digest) which is obtained as an output of a hash function to which the message M to be signed is supplied as an input.

$$\sigma \leftarrow \mathrm{Sign}(sk, M) \tag{2}$$

Verification:

Verifying the signature σ for the message (document) M (correctness of a pair of the message (document) M and the signature σ) using the verification key vk.

$$0/1 \leftarrow \mathrm{Verify}(vk, M, \sigma) \tag{3}$$

where, 1 is selected for acceptance and 0 is selected for non-acceptance, though not limited thereto.

In digital signature, in a case where a public key is publicly available, those who obtain a document and a signature can perform verification of the signature for the document (message) That is, using a verification key, which is a public key, it is possible to verify whether or not the signature has been generated for the document (message) using the signing key. The digital signature may be used for a variety of applications, such as e-mail protection (S/MIME (Secure/Multipurpose Internet Mail Extensions)) and electronic contracts. The digital signature may be used as a contractor's signature to electronic contract data instead of a seal in a written contract. In a case of virtual currency remittance, a message which includes information on "to which address and how much to remit" and a sender's digital signature for the message are recorded in a blockchain. The remittance process is completed when this signature is correctly verified.

In digital signature, when a signing key is lost or stolen, the security is compromised. It is difficult for a user to properly manage a signing key. When a signing key is not properly managed, there is a risk that the signing key may be lost or stolen. Failure to properly manage the signing key may disable the "signer" to generate a correct signature (e.g., when the signing key is lost) or allow a person who is not the "signer" to generate a correct signature (e.g., when the signing key is stolen).

Security of digital signatures is based on a fact that a signing key is managed to be kept in secret. An adversary, once obtaining the signing key, can generate a signature correctly. In other words, what digital signature guarantees is that "a person with a signing key has given the signature to a document," not that "a 'signer' has given the signature to a document. The larger the number of keys a user has to manage, the more difficult becomes the management thereof. Regarding a digital signature with a key enabled for distributed management, such as multi-signatures, reference may be made to, for example, Non-Patent Literature (NPL) 1.

A digital signature using biometric information has been proposed as a biometric signature (Fuzzy signature) (Patent Literature (PTL) 1). The following describes an outline of an example of the biometric signature.

Key Generation:

Generating a verification key from biometric information.

Signing:

Generating a signature σ for a document (message) M using the biometric information.

Verification:

Verifying the signature σ for the document (message) M (correctness of a pair of the document (message) M and the signature σ using the verification key.

[PTL 1] Japanese Patent No. 5707311

[PTL 2] Japanese Unexamined Patent Application Publication No. 2001-087167 A

[NPL 1] Antonio Nicolosi, et al., "Proactive Two-Party Signatures for User Authentication," Conference: Proceedings of the Network and Distributed System Security Symposium, NDSS 2003, San Diego, California, USA

[NPL 2] David Derler, et al., "Key-Homomorphic Signatures: Definitions and Applications to Multiparty Signatures and Non-Interactive Zero-Knowledge," Designs, Codes and Cryptography 87, 1372-1413, 2019

SUMMARY

A digital signature using biometric information in place of a key, can reduce a risk of losing the key as compared with the digital signature. However, when biometric information is used as a key, leakage of the biometric information means leakage of the key. It is difficult to change biometric information. Therefore, once biometric information is leaked, a key generated from that biometric information can no longer be safely used.

An object of the present disclosure is to provide a system, method and non-transitory medium, each enabling to reduce risk such as loss and leakage of a key in a digital signature and to improve an accuracy in confirming identity of biometric information.

According to one of aspects of the present disclosure, there is disclosed a digital signature system including: a first signature generation apparatus that includes at least a processor and a communication interface; and a second signature generation apparatus that includes at least a processor and a communication interface, the first signature generation apparatus and the second signature generation apparatus communicatively connected to each other using respective communication interfaces thereof.

The second signature generation apparatus is configured to receive a first parameter generated using at least first biometric information to store the first parameter in a storage of the second signature generation apparatus.

The first signature generation apparatus is configured to generate a second parameter using at least second biometric information; and transmit the second parameter to the second signature generation apparatus.

The second signature generation apparatus is configured to receive the second parameter transmitted by the first signature generation apparatus; generate a second signature for a message to be signed, using the first parameter and the second parameter; and transmit the second signature to the first signature generation apparatus.

The first signature generation apparatus is configured to receive the second signature transmitted by the second signature generation apparatus; and generate a first signature for the message using at least the second signature to output the first signature.

According to one of aspects of the present disclosure, there is disclosed a digital signature method including:

- receiving, by a second node, a first parameter generated using at least first biometric information to store the first parameter in a storage;
- generating, by a first node, a second parameter using at least second biometric information to transmit, to the second node, the second parameter and a message to be signed;
- generating, by the second node communicatively connecting with the first node, a second signature for the message using the first parameter and the second parameter to transmit the second signature to the first node; and
- generating, by a first node, a first signature for the message based on the second signature to output the first signature.

According to one of aspects of the present disclosure, there is disclosed a non-transitory computer-readable medium storing a program causing a first processing apparatus and a second processing apparatus, the first processing apparatus and the second processing apparatus communicatively connected to each other, to execute processing comprising:

- receiving, by the second processing apparatus, a first parameter generated using at least first biometric information to store the first parameter in a storage;
- generating, by the first processing apparatus, a second parameter using a t least second biometric information to transmit, to the second processing apparatus, the second parameter and a message to be signed;
- generating, by the second processing apparatus communicatively connecting with the first processing apparatus, a second signature for the message using the first parameter and the second parameter to transmit the second signature to the first processing apparatus; and
- generating, by the first processing apparatus, a first signature for the message based on the second signature to output the first signature.

According to the present disclosure, there are provided a system, method and non-transitory medium, each enabling to reduce both risks of loss and leakage of a key simultaneously in digital signature.

EXAMPLE EMBODIMENTS

The following describes example embodiments of the present disclosure. Biometric information of a person is difficult to set linkage with other person(s) (~ difficult to be stolen) and difficult to disconnect linkage from the person him/herself (~ difficult to lose). Instead of using only biometric information to generate a signature, one of two signing keys which are distributed to be held by two parties, is replaced with biometric information. Since a signing key generated from biometric information is used in pairs with another signing key (counter signing key), it is possible to associate with a single biometric modality (e.g., face, fingerprint, finger vein, iris, etc.) to multiple keys, by changing the counter signing key. The counter signing keys that are paired with biometric information may be stored in a computer, smartphone, token, IC card, or other device in user's hands, a cloud server, or a server managed by a service provider. According to the disclosure, it is possible to reduce simultaneously risk of both key-loss and risk of key-leakage in digital signature. According to the disclosure, a last process to complete generation of the signature in a distributed manner may be performed by a user-side (client) apparatus which after verifying the completed signature, transmits the completed signature to a verification apparatus. Thus, even if an apparatus on a server-side involved in generation of the signature should commit injustice (fraudulent), it is possible to detect a case where the apparatus on a server-side uses parameters other than those indicated.

Figure 1:
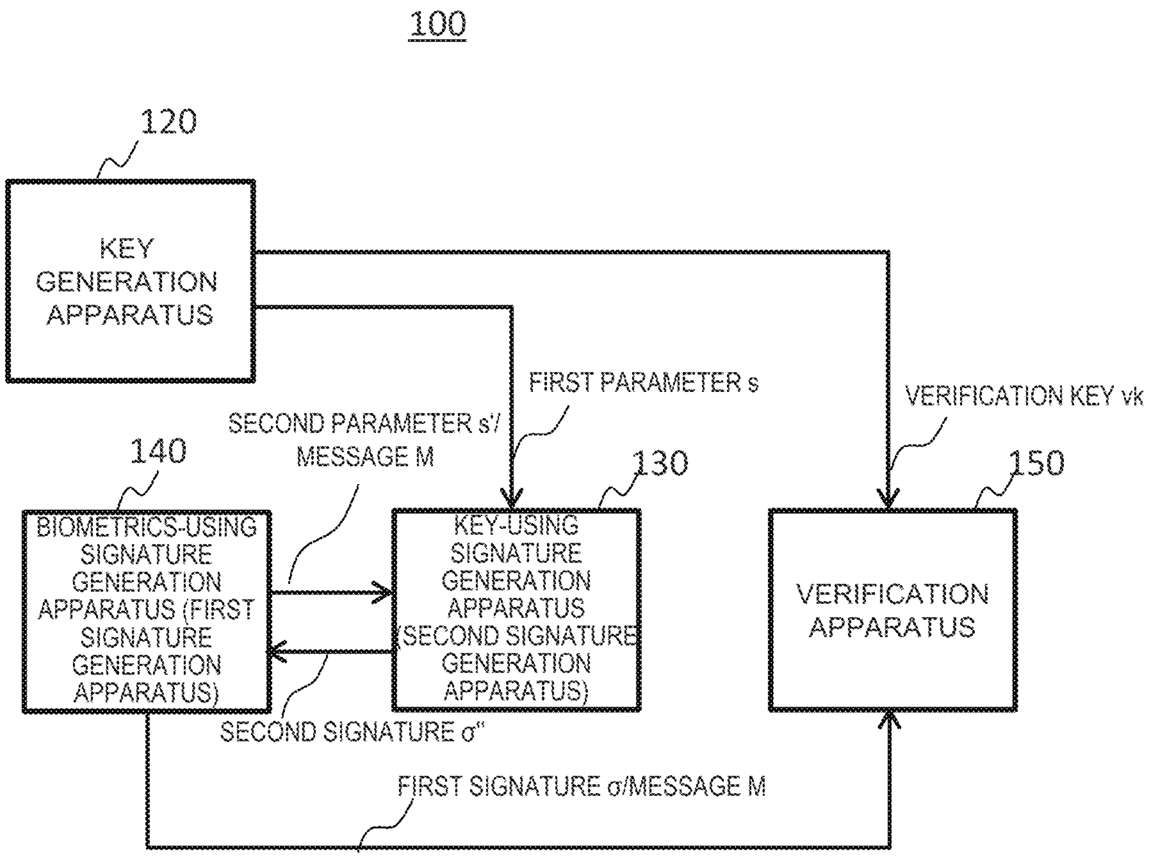
FIG. 1 is a diagram illustrating one of example embodiments.

FIG. 1 is a diagram schematically illustrating a configuration example in one of example embodiments of the present disclosure. Referring to FIG. 1, a digital signature system 100 is provided with a key generation apparatus 120, a key-using signature generation apparatus 130, a biometrics-using signature generation apparatus 140, and a verification apparatus 150.

In a key generation/registration phase, the key generation apparatus 120 generates a key pair of secret key sk and public key vk, with a security parameter k, using a key generation algorithm KeyGen.

$$(sk, vk) \leftarrow KeyGen(1^{\kappa}) \tag{4}$$

This key generation algorithm KeyGen may return the pair of secret key sk and public key vk as a return value. The KeyGen may receive public parameters generated based on the security parameter kin a setup algorithm and generate the pair of secret key sk and public key vk from public parameters. In a key generation, a public key vk may be generated from a secret key sk, by using a one-way hash function (cryptographic hash function, linear hash function). Alternatively, the public key vk may be generated, using a generator g in a multiplicative group G of a prime order p and a mapping ϕ (mapping from a set to which the secret key sk belongs to Z (Z is an entire set of integers)), by calculating vk=g^ϕ(sk) (where ^ is a power operator). Further alternatively, the public key vk may be generated using a keyed-hash function. The secret key sk may be designated as a signing key (first signing key) x, and the public key vk may be referred to as a verification key. The key generation apparatus 120 transmits the verification key vk to the verification apparatus 150. The key generation apparatus 120 and the verification apparatus 150 may be communicatively connected via a network (e.g., at least one of a wired LAN (Local Area Network), a wireless LAN, a WAN (Wide Area Network), a mobile communication network, a virtual network, etc.). The verification key vk may not be transmitted to the verification apparatus 150, but it may be uploaded to a key server (a public key database) for registration in association with a key ID, etc. In this case, the verification apparatus 150 may retrieve the verification key vk from the key server (public key database), as necessary.

The key generation apparatus 120 acquires a first biometric information w. The key generation apparatus 120 applies an encoding function (encoding algorithm) (Encode, ENC) to the first signing key x to transform encoded key c←Encode(x) and compose (e.g., adds or performs exclusive OR) the encoded key ENC(x) and the first biometric information w to generate first parameter s. The first parameter s, in which the first signing key x is encoded and embedded in the first biometric information w, is also referred to as a first parameter s.

$$s := ENC(x) + w \tag{5}$$

The key generation apparatus 120 transmits the first parameter s to the key-using signature generation apparatus 130. The key generation apparatus 120 and key-using signature generation apparatus 130 may be communicatively connected via a network (e.g., at least one of a wired LAN (Local Area Network), a wireless LAN, a WAN (Wide Area Network), a mobile communication network, a virtual network, etc.). Applying an encoding function (Encode)/a decoding function (Decode) is referred to as encoding/decoding.

The key generation apparatus 120 may transmit the first parameter s based on the first biometric information w only to the key-using signature generation apparatus 130. The key generation apparatus 120 may not transmit anything to the biometrics-using signature generation apparatus 140. In FIG. 1, arrow lines with information to be transmitted, such as the first parameter s, the verification key vk, etc., are schematic examples of transmission of such information (a handshake between a transmission source and a destination is omitted), and of course do not mean that the communication between the transmission source and the destination is a one-way communication (or unidirectional). The same applies to subsequent drawings The biometrics-using signature generation apparatus 140 acquires second biometric information w' and a message M for signature in a step performing signature actually (signing phase), and also generates a differential key Δ. Then, it composites an encoded key ENC(Δ) and second biometric information w' to generate a second parameter s', where the encoded key ENC(Δ) is obtained by applying an encoding function (Encode) to the differential key Δ. The second parameter s' may be also referred to as a second parameter.

$$s' = ENC(\Delta) + w' \tag{6}$$

The differential key Δ may be also called a shift amount.

The biometrics-using signature generation apparatus 140 transmits the second parameter s'(=ENC(Δ)+w') and the message M to the key-using signature generation apparatus 130. It may be configured that the key-using signature generation apparatus 130 and the biometrics-using signature generation apparatus 140 are communicatively connected via a network (e.g., at least one of a wired LAN a wireless LAN, a WAN, a mobile communication network, a virtual network, etc.).

The key-using signature generation apparatus 130 receives the second parameter s' and the message M from the biometrics-using signature generation apparatus 140. The key-using signature generation apparatus 130 input a difference s-s' between the first parameter s and the second parameter s' into a decoding function Decode to generate a second signing key x'.

$$x' \leftarrow \text{Decode}(s - s') \tag{7}$$

The key-using signature generation apparatus 130 may calculate a key difference x' between the first signing key x and the differential key Δ using a key difference reconstruction function (algorithm) Diff (DiffRec), instead of using the decoding function Decode. The decoding function Decode is a function into which the difference s-s' between the first parameter s and the second parameter s' are inputted as an argument. The key difference reconstruction function Diff is a function that inputs the first parameter s and the second parameter s' to reconstruct a key difference corresponding thereto. It can be said that the only difference between Diff and Decode is, substantially, whether s and s' are input as two arguments or (s-s') is input as a single argument.

The key-using signature generation apparatus 130 generates a signature (second signature) σ' for a message (document) M using the second signing key x'

$$\sigma' \leftarrow \mathrm{Sign}(x', M) \tag{8}$$

The key-using signature generation apparatus 130 transmits the second signature σ' to the biometrics-using signature generation apparatus 140.

The biometrics-using signature generation apparatus 140 receives he second signature σ' and generates a first signature σ (=Sign(x,M)) for the message M with the first signing key x using a Key homomorphic operation KHom(Δ,σ').

$$\sigma(=\mathrm{Sign}(x, M)) \leftarrow KHom(\Delta, \sigma') \tag{9}$$

The biometrics-using signature generation apparatus 140 transmits the first signature σ and the message M to the verification apparatus 150. However, a transmission destination of the first signature σ is not limited to the verification apparatus 150, but the biometrics-using signature generation apparatus 140 may transmit the first signature σ to any apparatus (node) not shown in the drawing. The transmission destination of the first signature σ is not limited to the verification apparatus 150, but it may be configured that a pair of the signature and the message may be transmitted to a different apparatus other than the verification apparatus 150 to store therein, and then an apparatus that performs verification acquires the pair of the signature and the message stored in the different apparatus to verify the signature and the message. The apparatus that performs verification can be that different apparatus. In this case, there is a gap in the timing of signature generation and verification, and a plurality of signatures may be verified together. For example, in a blockchain network, the process is repeated. The process includes steps of transmitting a pair of a signature and a message to the nearest node, temporarily storing the pair of the signature and the message in the nearest node, verifying the signature and the message by the node, and propagating the signature to an other node if a verification result is acceptance.

The apparatus verification 150 receives and registers in a storage the verification key vk. The verification apparatus 150 receives the first signature σ and the message M transmitted from the biometrics-using signature generation apparatus 140. The verification apparatus 150 verifies the first signature σ for the message m (correctness of the pair of the message M and the first signature σ) using the verification key vk.

$$0/1 \leftarrow \mathrm{Verify}(vk, M, \sigma) \tag{10}$$

As a result of verification, 1 is selected for acceptance and 0 is selected for rejection (non-acceptance). The verification apparatus 150 may transmit the verification result, for example, to the biometrics-using signature generation apparatus 140 of a transmission source of the first signature σ. It may be configured that the biometrics-using signature generation apparatus 140 and the verification apparatus 150 are communicatively connected via a network (e.g., at least one of a wired LAN (Local Area Network), a wireless LAN, a WAN (Wide Area Network), a mobile communication network, a virtual network, etc.).

In FIG. 1, the key-using signature generation apparatus 130 may be referred to as a second signature generation apparatus because it generates the second signature σ' for the message M with the second signing key x', and the biometrics-using signature generation apparatus 140 may be referred to as the first signature generation apparatus because it generates the first signature σ when signing the message M with the first signing key x. The same applies to drawings subsequent to FIG. 1.

Figure 2:
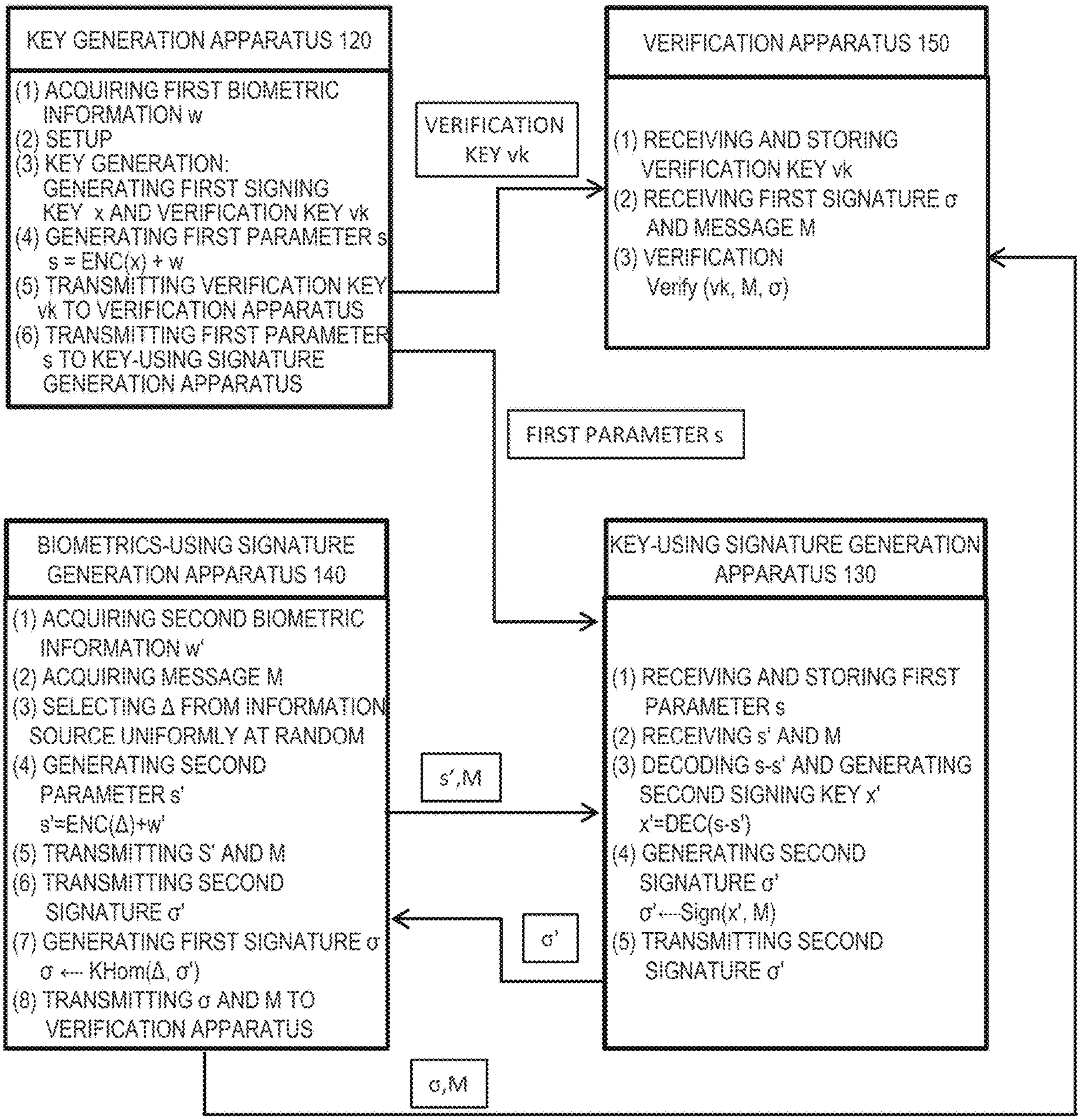
FIG. 2 is a diagram illustrating an operation process in the one of example embodiments.

FIG. 2 illustrates operation processes in each of the above apparatuses described with reference to FIG. 1. Some overlap with the explanation above, but operations are supplemented below. Note that in FIG. 2, the number in parentheses for each apparatus represents a processing number (step) at that apparatus.

The key generation apparatus 120 acquires first biometric information w for user registration (step 1). The first biometric information w is, for example, an n-dimensional vector.

The key generation apparatus 120 performs a setup algorithm for a digital signature scheme. The key generation apparatus 120 decides a parameter (public parameter) pp in advance according to a security parameter κ and makes it available to a user (setup) (step 2).

$$pp \leftarrow \mathrm{Setup}(1^{\kappa}) \tag{11}$$

The parameter pp includes information on group and hash function, etc., is a parameter common to the system, and is referred to here as a public parameter. Setup may be performed, for example, before system operation, and each of the apparatuses 120, 130, 140. and 150 of the digital signature system 100 can all use (share) the public parameter pp.

The key generation apparatus 120 generates a pair of first signing key (secret key) and first verification key (public key) according to the public parameter pp (step 3).

$$(sk, vk) \leftarrow KeyGen(pp) \tag{12}$$

The secret key (signing key) sk is to be a first signing key x.

The key generation apparatus 120 encodes the first signing key x to convert it into an encoded key ENC(x), then composites the encoded key ENC(x) and first biometric information w to generate a first parameter s (step 4).

$$s := ENC(x) + w \quad (13)$$

The key generation apparatus 120 transmits the verification key vk to the verification apparatus 150 (step 5). The verification apparatus 150 receives and stores the verification key vk (step 1).

The key generation apparatus 120 transmits the first parameter s to the key-using signature generation apparatus 130 (step 6). The key generation apparatus 120 may transmit the verification key vk before a generation process (step 4) of the first parameter s.

The encoding function Encode converts a plaintext m in an information source space into a code c. The decoding function converts the code c into the plaintext m.

$$c \leftarrow ENC(m) \quad (14)$$

$$m \leftarrow DEC(c) \quad (15)$$

Here, $$m = DEC(c') \quad (16)$$

must hold for a code c' whose difference from cis within a correction capability, where c is a code of any plaintext m in the information source space.

As explained below, in one of example embodiments, a linear code is used. The linear code has linearity with respect to a code.

Linearity:

$$ENC(m1) + ENC(m2) \quad (17)$$

is a code word for m1+m2. Therefore, $$m1 + m2 = DEC(ENC(m1) + ENC(m2)) \quad (18)$$

holds.

In Equation (18), the "+" on the left and right sides need not be the same operation.

With respect to coding, for example, error-correcting codes (Hamming codes, BCH (Bose-Chaudhuri-Hocquenghem code) codes, RS (Reed-Solomon) codes, LDPC (low-density parity-check code) codes, etc.) may be used. Alternatively, for example Lattice coding may be used. More concretely, methods using integer lattices, triangular lattices, and more complex lattices are known (see PTL 2, etc.).

The key-using signature generation apparatus 130 receives the first parameter s from the key generation apparatus and stores it (step 1).

The biometrics-using signature generation apparatus 140 acquires a second biometric information w' of a user (step 1), acquires a message M to be signed (step 2), and selects a differential key Δ (non-negative integer) uniformly at random from an information source (step 3). The differential key Δ is also referred to as a shift or a temporary key. The biometrics-using signature generation apparatus 140 generates a second parameter s' from an encoded value of the differential key Δ and the second biometric information w' (step 4).

$$s' = ENC(\Delta) + w' \quad (19)$$

The second biometric information w' is, for example, an n-dimensional vector.

The biometrics-using signature generation apparatus 140 transmits the second parameter s' and the message M to the key-using signature generation apparatus 130 (step 5).

The key-using signature generation apparatus 130 receives the second parameter s' and the message M (step 2) and generates a second signing key x' by $$x' \leftarrow \text{Decode}(s - s') \quad (20)$$

(3).

The key-using signature generation apparatus 130 generates a second signature σ' for the message M with the second signing key x' (step 4) and transmits the second signature σ' to the biometrics-using signature generation apparatus 140 (step 5). The biometrics-using signature generation apparatus 140 receives the second signature σ' (step 6) and generates a first signature σ (=Sign(x, M)) with the first signing key x for the message M by performing the Key homomorphic operation KHom(Δ,σ') to the second signature σ' (step 7).

$$\sigma(= \text{Sign}(x, M)) \leftarrow KHom(\Delta, \sigma') \quad (21)$$

The biometrics-using signature generation apparatus 140 transmits the first signature σ and the message M to the verification apparatus 150. As mentioned above, the destination of the first signature σ and the message M can be an apparatus other than the verification apparatus 150.

The key homomorphic operation σ←KHom(Δ,σ') in Equation (21) represents that an algorithm that generates, from a second signature σ' with the second signing key x'(=x−Δ) for a message M and a differential key Δ, a signature σ with the first signing key x for the message M can be configured.

The following outlines a key homomorphic scheme. As an example, it is explained using a Schnorr signature having a key homomorphic property (see NPL 2). In the following, a secret key sk and a public key pk of NPL 2 are denoted as a signing key sk and a verification key vk, respectively.

Example 1: Schnorr Signature

Setup

In Setup (1^κ) a group G of order p, where p is a prime number with κ bits (κ is a security parameter), is selected, wherein p satisfies $$\kappa = \lceil \log_2 p \rceil \quad (22)$$

⌈ ⌉ represents a ceiling function for rounding up to integer values. Then, g is selected uniformly at random from G ($g \xleftarrow{R} G$), hash function H: G×{0, 1}*→{0, 1}$^n$ is selected uniformly at random from a hash function family {$H_k$}k, and (G, g, H) is to be a public parameter pp.

$$pp \leftarrow (G, g, H) \tag{23}$$

Key Generation:

In KeyGen(pp), a signing key and a verification key are generated according to the public parameter pp. x is selected uniformly at random from Zp (set of integers between 0 and p, exclusive of p (=Z/pZ)).

$$dx \xleftarrow{R} Zp \tag{24}$$

The verification key and the signing key are decided as follows, respectively and are outputted.

$$\text{verification key: } vk \leftarrow g^x, \quad \text{signing key: } sk \leftarrow x \tag{25}$$

Signing:

In Sign(sk, M), r is selected uniformly at random from Zp ($r \xleftarrow{R} Zp$) and signature σ calculated as follows is outputted.

$$c \leftarrow H(g^r, M) \quad y \leftarrow r + x \cdot c \mod p \quad \sigma \leftarrow (c, y) \tag{26}$$

Verification:

In Verify(vk, M, σ), if $$c = H(((g^x)^{-c} g^y), M) \tag{27}$$

holds, 1 is outputted, if not, 0 is outputted.

Key Homomorphic Operation:

If signature σ←Sign(sk,M)=(c, y) is a correct signature for message M under a verification key vk, a new signature calculated using o and difference key Δ:

$$\sigma' \leftarrow (c, y') \quad y' \leftarrow y + \Delta \cdot c \mod p \tag{28}$$

is found to be a correct signature for the message M under the verification key $$vk' = g^{x+\Delta} \tag{29}$$

In other words, the followings hold.

$$H(vk'^{-c} g^{y'}, M) = H(\{g^{(x+\Delta)}\}^{-c} \cdot g^{r+(x+\Delta)c}, M) \tag{30}$$

-continued $$= H(g^{-(x+\Delta)c} \cdot g^r \cdot g^{(x+\Delta)c}, M)$$

$$= H(g^r, M) = c$$

Note that NPL 2 discloses the algorithm Adapt, which includes a conversion process that converts signature σ with a signing key sk to a signature σ' with a signing key sk+Δ. In the present example embodiment, an algorithm for converting a second signature σ' with a second signing key x'(=x−Δ) for a message M to a first signature σ with a first signing key x(=(x−Δ)+Δ) for the message M is called KHom. KHom does not correspond to the Adapt in NPL 2, but a shift Δ in Adapt may be corresponded to a differential key Δ in the present example embodiment (If sk in Adapt of NPL 2 to x−Δ, KHom can partially correspond to Adapt of NPL 2).

The verification apparatus 150 receives the first signature σ and the message M transmitted from the biometrics-using signature generation apparatus 140 (2) and verifies correctness of a pair of the message M and the first signature σ using the verification key vk (3).

Figure 3:
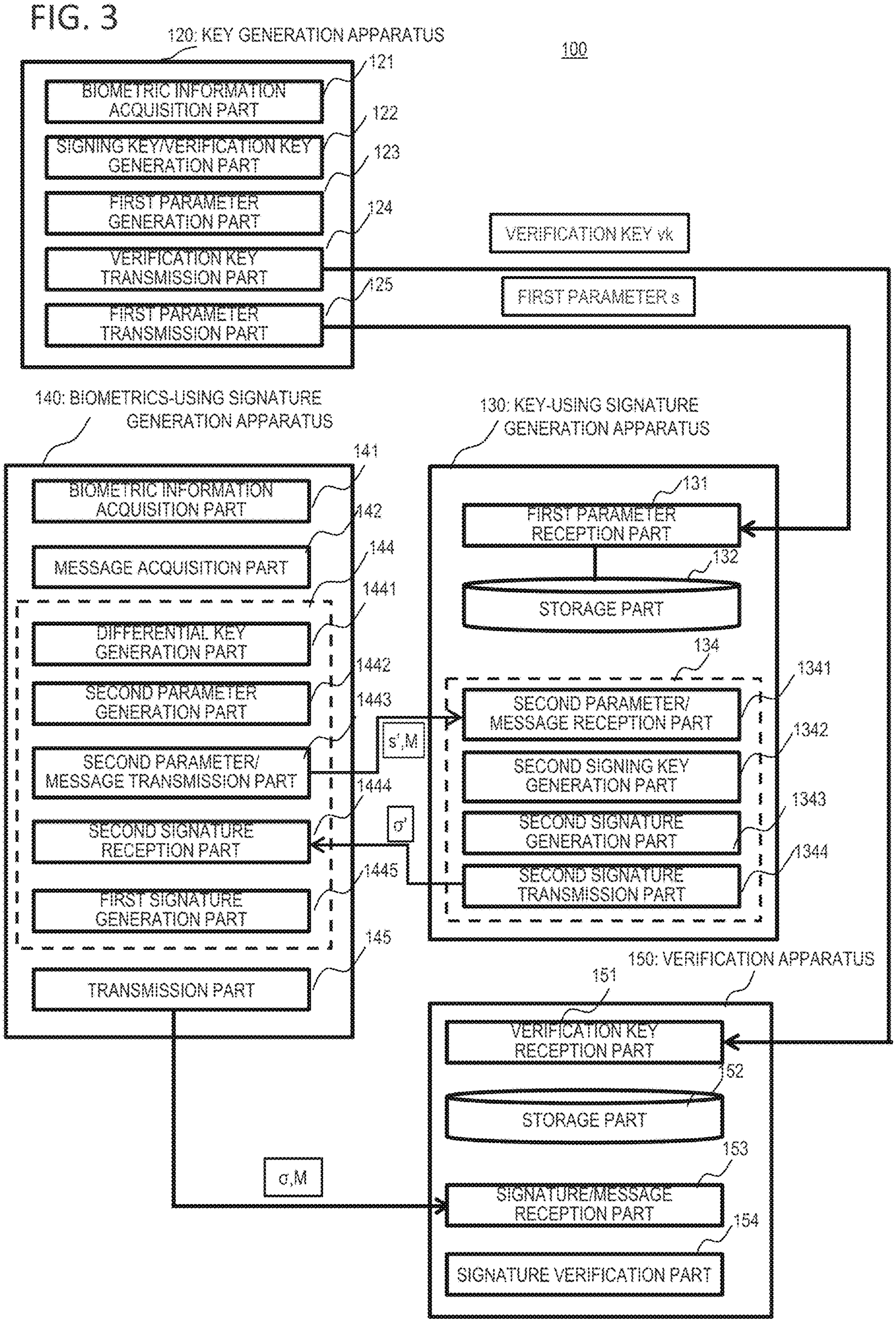
FIG. 3 is a diagram illustrating a configuration in the one of example embodiments.

FIG. 3 is a diagram illustrating an example of a configuration of each apparatus in FIG. 1. The key generation apparatus 120 is provided with a biometric information acquisition part 121, a signing key/verification key generation part 122, a first parameter generation part 123, a verification key transmission part 124, and a first parameter transmission part 125. The biometric information acquisition part 121 is provided with a sensor (not shown) to acquire first biometric information w of user (or is provided with an interface to receive the first biometric information w acquired by an external sensor via a network such as a communication line). The signing key/verification key generation part 122 generates a first signing key x and a first verification key vk. The first parameter generation part 123 uses the first signing key x and the first biometric information w to generate a first parameter s. The verification key transmission part 124 transmits the first verification key vk to the verification apparatus 150. The first parameter transmission part 125 transmits the first parameter s to the key-using signature generation apparatus 130. The verification key transmission part 124 may transmit the verification key vk to a key server (a public key database), etc.

The key-using signature generation apparatus 130 is provided with a first parameter reception part 131, a storage part 132, and a signature generation part 134. The first parameter reception part 131 receives the first parameter S transmitted from the key generation apparatus 120. The storage part 132 stores the first parameter s received at the first parameter reception part 131. The signature generation part 134 transmits and receives information between the key-using signature generation apparatus 130 to generate a second signature σ' for the message M. The signature generation part 134 is provided with a second parameter/message reception part 1341, a second signing key generation part 1342, a second signature generation part 1343, and a second signature transmission part 1344. The second parameter/message reception part 1341 receives the second parameter s' and the message M transmitted from the biometrics-using signature generation apparatus 140. The second signing key generation part 1342 generates a second signing key x'. The second signature generation part 1343 generates a second signature σ' for the message M using the second signing key x'. The second signature transmission part 1344 transmits the second signature σ' to the biometrics-using signature generation apparatus 140.

The biometrics-using signature generation apparatus 140 is provided with a biometric information acquisition part 141, a message acquisition part 142, a signature generation part 144, and a transmission part 145. The biometric information acquisition part 141 is provided with a sensor (not shown) etc., to acquire a second biometric information w' of a user. The message acquisition part 142 acquires a message M to be signed. The signature generation part 144 transmits and receives information between the key-using signature generation apparatus 130 to generate a first signature σ for the message M with the first signing key x. The transmission part 145 transmits the first signature σ and the message M to the verification apparatus 150. The signature generation part 144 is provided with a differential key generation part 1441, a second parameter generation part 1442, a second parameter/message transmission part 1443, a second signature reception part 1444, and a first signature generation part 1445. The differential key generation part 1441 generates a differential key Δ. The second parameter generation part 1442 generates a second parameter s' using the differential key Δ and the second biometric information w'. The second parameter/message transmission part 1443 transmits the second parameter s' and the message M to the signature generation part 134 in the key-using signature generation apparatus 130. The second signature reception part 1444 receives the second signature σ' generated at the signature generation part 134 in the key-using signature generation apparatus 130. The first signature generation part 1445 generates a first signature σ for the message M with the first signing key x from the second signature σ' and the differential key Δ using the Key homomorphic operation. The sensor (not shown) in the biometric information acquisition part 141 has the same configuration as the sensor (not shown) in the biometric information acquisition part 121 in the key generation apparatus 120.

The verification apparatus 150 is provided with a verification key reception part 151, a storage part 152 storing a verification key vk received, a signature/message reception part 153, and a signature verification part 154. The verification key reception part 151 receives a verification key vk generated in the key generation apparatus 120. The storage part 152 stores the verification key vk received. The signature/message reception part 153 receives the first signature σ the message M transmitted from the biometrics-using signature generation apparatus 140. The signature verification part 154 verifies correctness of a pair of the message M and the first signature σ using the verification key vk generated in the key generation apparatus 120. The verification key reception part 151 may acquire the verification key vk from a key server (public key database; not shown).

Figure 4:
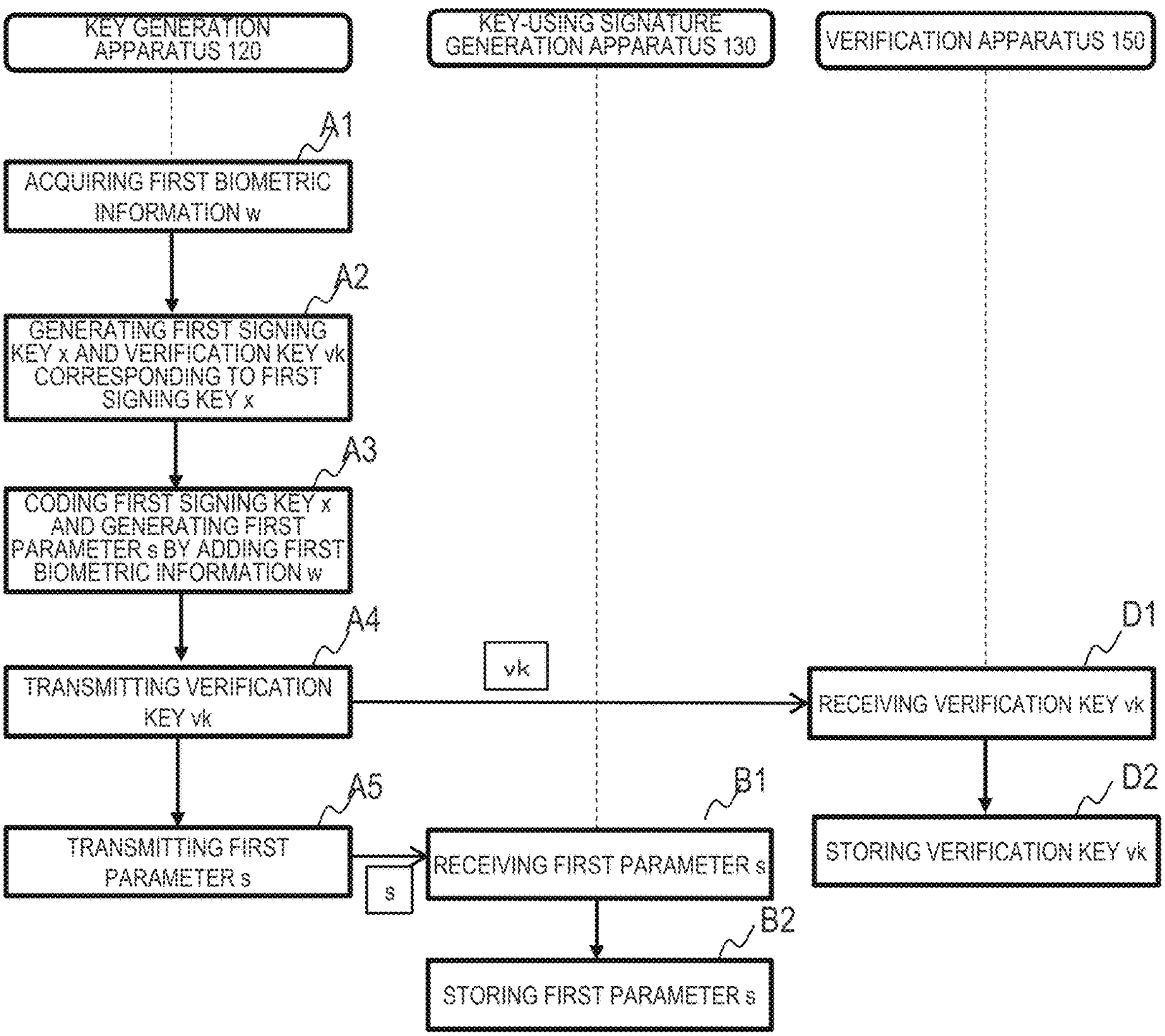
FIG. 4 is a diagram illustrating a process sequence in the one of example embodiments.

FIG. 4 is a diagram illustrating an example of processing operations in a key registration phase in the present example embodiment illustrated in FIG. 3. The biometric information acquisition part 121 in the key generation apparatus 120 acquires first biometric information w for a user registration (step A1).

The signing key/verification key generation part 122 in the key generation apparatus 120 generates a pair of a first signing key x and a first verification key vk corresponding to the first signing key x (step A2).

The first parameter generation part 123 in the key generation apparatus 120 encodes the first signing key x and composites the first biometric information w to the encoded key ENC(x) encoded to generate a first parameter s $$s := ENC(x) + w \tag{31}$$

(step A3).

Hereinafter, as a non-limiting example, Equation (31) is explained according to an example using a square lattice as an encoding (e.g., PTL 2). The first biometric information w and the second biometric information w' are n-dimensional real vectors.

$$w = (w1, \ldots, wn),\ w' = (w'1, \ldots, w'n) \tag{32}$$

As a distance between the first biometric information w and the second biometric information w', $L^\infty$ distance ($L^\infty$ norm: maximum norm) is expressed as follows.

$$d_\infty^{(n)}(w, w') = \max\{|w_i - w'_i|, i = 1, \ldots, n\} \tag{33}$$

If $d^{(n)}_\infty(w,w')$ is less than or equal to the specified threshold value $t_h$ ($d^{(n)}_\infty(w, w') \leq t_h$), it is considered as a match (same organism).

Lattice points set L is defined as follows.

$$L = \{Y = (y_1, \ldots, y_n) |\ y_i \text{ is a non-negative integer, } 0 \leqq y_i \leqq K\} \tag{34}$$

Here, K is a specified integer that is sufficiently larger than $t_h$ and $|w_i|$.

The function int ( ) that maps one integer z to an n-dimensional vector Y∈L is defined as follows.

$$z \leftarrow \text{int}(Y) = \Sigma[i = 1, n] yi(2K)^{i-1} \tag{35}$$

An inverse function $\text{int}^{-1}$ ( ) is a function that maps integer z to n-dimensional vector Y.

$$Y \leftarrow \text{int}^{-1}(z) \tag{36}$$

When the first signing key x (integer) is input into the inverse function $\text{int}^{-1}$ ( ) an n-dimensional vector A is obtained.

$$A = (a_1, \ldots, a_n) \leftarrow \text{int}^{-1}(x) \tag{37}$$

If an encoding function Encode ( ) is set to $2t_h * \text{int}^{-1}(\ )$ then encoded key c, which encodes the first signing key x, becomes an n-dimensional vector and is given below.

$$c = (c_1, \ldots, c_n) \leftarrow \text{Encode}(x) = 2t_h * \text{int}^{-1}(x) = 2t_h * (a_1, \ldots, a_n) \tag{38}$$

Thus, the first parameter s is given by follows.

$$s := ENC(x) + w = 2t_h * (a_1, \ldots, a_n) + (w_1, \ldots, w_n) = (2t_h * a_1 + w_1, \ldots, 2t_h * a_n + w_n) \quad (39)$$

The verification key transmission part 124 in the key generation apparatus 120 transmits the first verification key vk generated to the verification apparatus 150 (step A4). The key generation apparatus 120 may upload the first verification key vk to a key server (public key database; not shown) or the like and publish it on the Internet or the like.

The first parameter transmission part 125 in the key generation apparatus 120 transmits the first parameter s to the key-using signature generation apparatus 130 (step A5). The order of steps A4 and A5 may be interchanged.

The verification key reception part 151 in the verification apparatus 150 receives the first verification key vk (step D1) and store the first verification key vk in the storage part 152 (step D2). The verification key reception part in the verification apparatus 150 may acquire and store the verification key vk from a key server (not shown) that has registered the verification key.

The first parameter reception part 131 in the key-using signature generation apparatus 130 receives the first parameter s (step B1) and store it in the storage part 132 (step B2).

Figure 5:
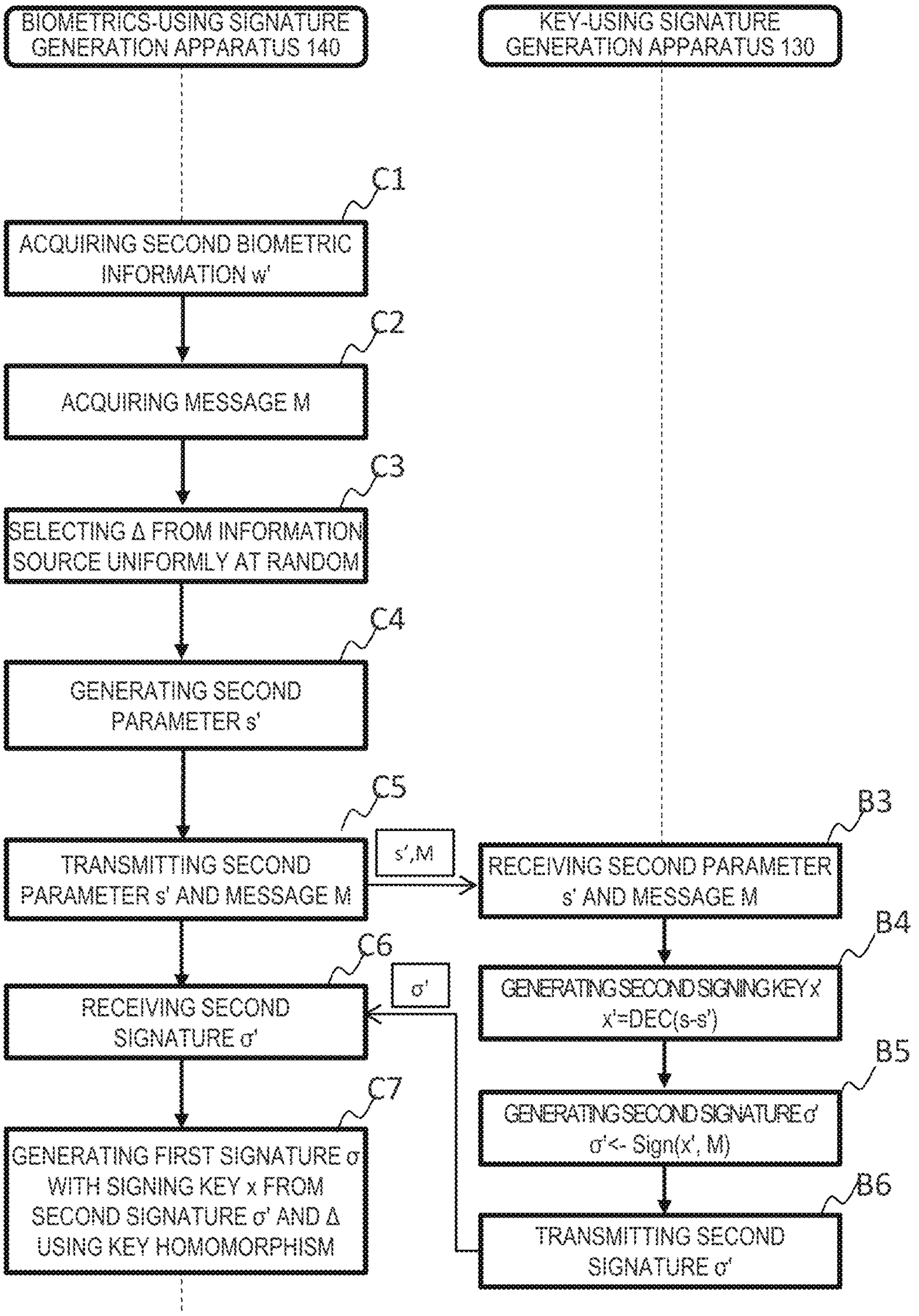
FIG. 5 is a diagram illustrating a process sequence in the one of example embodiments.

FIG. 5 is a diagram illustrating an example of a processing operation of signature creation phase in the present example embodiment illustrated in FIG. 3.

The biometric information acquisition part 141 in the biometrics-using signature generation apparatus 140 acquires second biometric information w' for user signature (step C1).

The message acquisition part 142 in the biometrics-using signature generation apparatus 140 acquires a message M (step C2).

The differential key generation part 1441 in the biometrics-using signature generation apparatus 140 selects random number 4 from an information source uniformly at random to make it a difference key (step C3).

The second parameter generation part 1442 in the biometrics-using signature generation apparatus 140 composites a value ENC(Δ) encoding the differential key Δ and the second biometric information w' to generate a second parameter s' (step C4).

$$s' := ENC(\Delta) + w' \quad (40)$$

As a non-limiting example, if a square lattice is used as an encoding the same as in the first parameter s, from $$c' = (c'_1, \ldots, c'_n) \leftarrow \text{Encode}(\Delta) = 2t_h * \text{int}^{-1}(x) = 2t_h * (a'_1, \ldots, a'_n) \quad (41)$$

second parameter s' is a n-dimensional real-valued vector as follows.

$$s' := 2t_h * \text{int}^{-1}(\Delta) + w' = 2t_h * (a'_1, \ldots, a'_n) + (w'_1, \ldots, w'_n) = (2t_h * a'_1 + w'_1, \ldots, 2t_h * a'_n + w'_n) \quad (42)$$

The second parameter/message transmission part 1443 in the biometrics-using signature generation apparatus 140 transmits the second parameter s' and the message M to the key-using signature generation apparatus 130 (step c5).

The second parameter-message reception part 1341 in the key-using signature generation apparatus 130 receives the second parameter s' and the message M transmitted from the biometrics-using signature generation apparatus 140 (step B3).

The second signing key generation part 1342 in the key-using signature generation apparatus 130 makes a decoded value a second signing key x' (step B4). The decoded value is obtained by inputting a difference s-s' between the first parameter s and the second parameter s' into the decoding function Decode.

$$x' \leftarrow \text{Decode}(s - s') \quad (43)$$

The difference s–s' is expressed as follows due to a linearity of code: ENC(x)–ENC(Δ)=ENC(x–Δ).

$$s - s' = (w1, \ldots, wn) + ENC(x) - \{(w'1, \ldots, w'n) + ENC(\Delta)\} = (w1, wn) - (w'1, \ldots, w'n) + ENC(x) - ENC(\Delta) = (w1 - w'1, \ldots, wn - w'n) + ENC(x - \Delta) \quad (44)$$

If the difference w–w'=(w1–w'1 . . . , wn–w'n) between the first biometric information w and the second biometric information w' is included, for example, in a correction capability of linear code, the difference is to be absorbed with the decoding function Decode, and Equation (43) becomes from Equation (44) as follows.

$$x' \leftarrow \text{Decode}(s - s') = DEC(ENC(x - \Delta)) \quad (45)$$

From Equation (45), $$x' = x - \Delta \quad (46)$$

holds.

As a non-limiting example, if a square lattice is used for encoding and $2t_h*\text{int}^{-1}(\ )$ is used as the encoding function Encode, the decoding function Decode may be $$\text{Decode}(c) = \text{int}(c/2t_h) \quad (47)$$

In this case, since x and Δ are integer values, Decode (s–s') is given by $$\text{int}\left[\frac{1}{2t_h}\{(w + 2t_h * \text{int}^{-1}(x)) - (w' * 2t_h * int^{-1}(\Delta))\}\right] = \text{int}\left\{\text{int}^{-1}(x - \Delta) + \frac{1}{2C_h}(w - w')\right\} \quad (48)$$

For the first biometric information w and the second biometric information w', when $$d_{\infty}^{(n)}(w, w') = \max\{|w_i - w_i'|, i = 1, \ldots , n\} \leqq t_h \quad (49)$$

holds, in Equation (48), each component of the n-dimensional vector $(w-w')/2t_h$ is all less than or equal to ±½, and Equation (48) is expressed as int $(\text{int}^{-1}(x-\Delta))$. Then, the value x' of Decode (s–s') in Equation (45) becomes $$x' = \text{int}(\text{int}^{-1}(x - \Delta)) = x - \Delta \quad (50)$$

From the above, it can be confirmed that the difference x–Δbetween the first signing key x and the differential key Δ is correctly reconstructed by the decoding function Decode. The encoded keys encoding the first signing key x and the differential key Δ, second biometric respectively, and the first and information are composited by vector addition, respectively. Therefore, the key-using signature generation apparatus 130 can correctly calculate the second signing key x', which is the difference x–Δ between the first signing key x and the differential key Δ, by decoding a subtraction of the first parameter s and second parameter s'.

The second signature generation part 1343 in the key-using signature generation apparatus 130 uses the second signing key x' generates a second signature:

$$\sigma' \leftarrow \text{Sign}(x', M) \quad (51)$$

for the message M using the second signing key x' (step B5).

The second signature transmission part 1344 in the key-using signature generation apparatus 130 transmits the second signature σ' to the biometrics-using signature generation apparatus 140 (step B6).

The second signature reception part 1444 in the biometrics-using signature generation apparatus 140 receives the second signature σ' transmitted from the key-using signature generation apparatus 130 (step C6).

The first signature generation part 1445 in the biometrics-using signature generation apparatus 140 generates a first signature σ for the message M with the first signing key x from the second signature σ' for the message M with the second signing key x' by a Key homomorphic operation using the second signature σ' and the differential key Δ

$$\sigma \leftarrow KHom(\Delta, \sigma') \quad (52)$$

(step C7).

Figure 6:
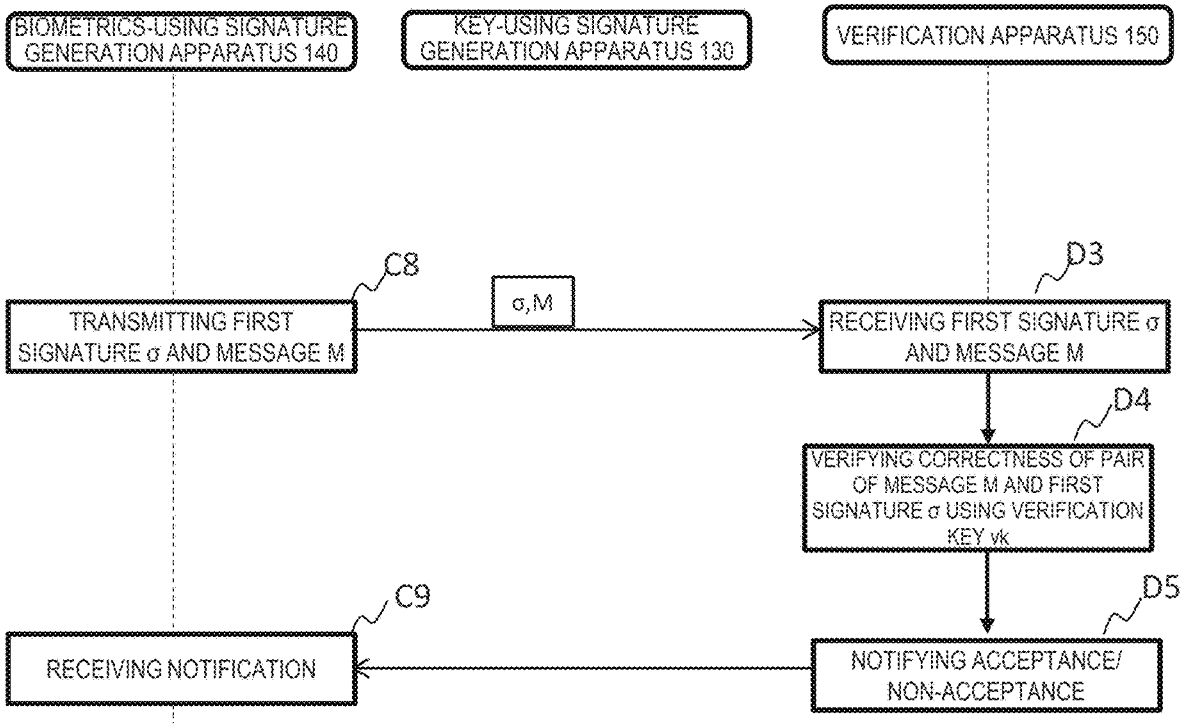
FIG. 6 is a diagram illustrating a process sequence in the one of example embodiments.

FIG. 6 is a diagram illustrating an example of a processing operation of signature verification phase in the present example embodiment illustrated in FIG. 3.

The transmission part 145 in the biometrics-using signature generation apparatus 140 transmits the first signature σ and the message M to the verification apparatus 150 (step C8).

The signature/message reception part 153 in the verification apparatus 150 receives the first signature σ and the message M transmitted from the biometrics-using signature generation apparatus 140 (step D3).

The signature verification part 154 verifies correctness of a pair of the message M and the first signature σ using the verification key vk (step D4).

It may be configured that the verification apparatus 150 transmits a verification result (acceptance/non-acceptance notification) to the biometrics-using signature generation apparatus 140 of a transmission source (step D5). In this case, the biometrics-using signature generation apparatus 140 receives acceptance/non-acceptance notification (step C9).

The timing of the verification process is arbitrary. For example, by verifying a signature that is stored with a message M at the time the message M is to be used, it is possible to verify that the message M has not been altered, including during storage. A pair of the message M and the signature may be verified a plurality of times.

Figure 7:
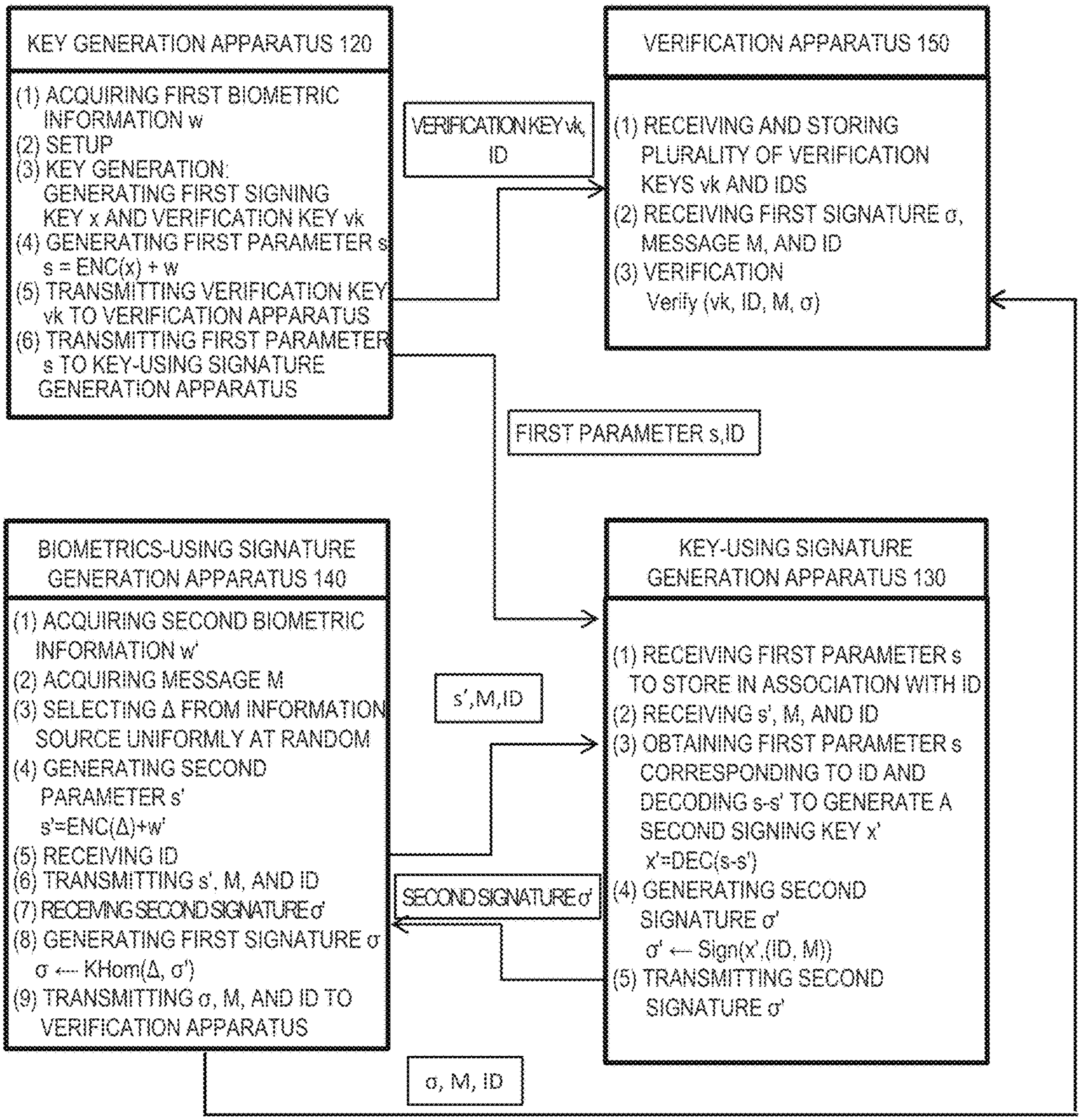
FIG. 7 is a diagram illustrating an operation process in another one of example embodiments.

FIG. 7 is a diagram illustrating the another one of example embodiments and corresponds to the FIG. 2 described above. The system configuration of the another one of example embodiments is basically the same as that illustrated in FIG. 3. The difference from that illustrated in FIG. 2 is that the first parameter s and the verification key vk can be specified by ID (e.g., account ID). A plurality of pairs of keys (a signing key and verification key) can be used for the same first biometric information of the same user. A user who registers first biometric information w can specify the first parameters and/or the verification keys vks using a plurality of IDs for each user (in the case of using one ID corresponds to the first example embodiment). This ID, also called Key-ID, is not an ID for user identification, and one user can have a plurality of IDs. This example embodiment is applicable to the system, for example, that if a user having two crypto assets, A coins and B coins, wants to send 100 units of A coins, he/she requests the key-using signature generation apparatus 130 to generate a second signature σ' for a message thereof using the first parameter s for A coins and transmits a first signature σ generated in the biometrics-using signature generation apparatus 140 to a chain of A coins.

The key generation apparatus 120 acquires first biometric information w for user registration (step 1). The key generation apparatus 120 performs a key generation algorithm for a digital signature scheme. The key generation apparatus 120 decides a parameter (public parameter) pp in advance according to a security parameter κ and makes it available to a user (setup) (step 2).

The key generation apparatus 120 repeats processes (step 3) and (step 4) for each user ID. For example, if the user IDs are ID1, ID2, and ID3, processes: (step 3) and (step 4) may be repeated for each ID.

The key generation apparatus 120 generates a first signing key x and a verification key vk (step 3).

The key generation apparatus 120 encodes the first signing key x to convert it into an encoded key, then composites the encoded key ENC(x) and first biometric information w to generate a first parameter s (=ENC(x)+w)(step 4).

The key generation apparatus 120 transmits the verification key vk generated for each of ID1, ID2, and ID3 to the verification apparatus 150 together with the ID (step 5).

The key generation apparatus 120 transmits the first parameter s generated for each of ID1, ID2, and ID3 to the key-using signature generation apparatus 130 together with the ID (step 6).

Process (step 5) may be performed following the process (step 3). Process (step 6) may be performed following the process (step 4).

The key generation apparatus 120 may transmit the signing key vk and corresponding ID generated for each of ID1, ID2, and ID3 to the verification apparatus 150 individually, or may combine them into one data ((vk1, ID1), (vk2, ID2), (vk3, ID3)) in a single transmission. The key generation apparatus 120 may transmit the first parameter s and corresponding ID generated for each of ID1, ID2, and ID3 to the key-using signature generation apparatus 130 individually, or may combine them into one data ((s1,ID1), (s2,ID2), (s3,ID3)) in a single transmission.

The key-using signature generation apparatus 130 receives and stores the first parameters s and IDs from the key generation apparatus 120 (step 1).

The biometrics-using signature generation apparatus 140 newly acquires a second biometric information w' of a user (step 1), acquires a message M to be signed (step 2), and selects a differential key Δ (non-negative integer) uniformly at random from an information source (step 3).

The biometrics-using signature generation apparatus 140 generates a second parameter s'(=ENC(Δ)+w') from an encoded value of the differential key Δ and the second biometric information w' (step 4).

The biometrics-using signature generation apparatus 140 receives an ID from an input device (not shown) (step 5) and transmits the second parameter s', the message M to be signed, and the ID to the key-using signature generation apparatus 130 (step 6).

The key-using signature generation apparatus 130 receives the second parameter s', the message M, and the ID (step 2).

The key-using signature generation apparatus 130 obtains the first parameter s corresponding to the ID and decode a difference between the first parameter s and the second parameter s' corresponding to ID to generate a second signing key x' (step 3).

$$x' \leftarrow \mathrm{Decode}(s - s') \tag{53}$$

The key-using signature generation apparatus 130 generates a second signature σ' for the message M to be signed with the second signing key x' (step 4).

$$\sigma' \leftarrow \mathrm{Sign}(x', M) \tag{54}$$

Here, the key-using signature generation apparatus 130, when generating the second signature σ' with the second signing key x' for the message M to be signed, may generate the signature for the message M and the ID as follows.

$$\sigma' \leftarrow \mathrm{Sign}(x', (ID, M)) \tag{55}$$

The signature for the message M and the ID is not limited to the above Equation (54). For example, a way of combining an ID and a message M can be any way, such as,—hashing the concatenation of the ID and the message M, and concatenating the hash value H (M) and H (ID) of each of ID and message M, respectively.

The key-using signature generation apparatus 130 transmits the second signature σ' to the biometrics-using signature generation apparatus 140 (step 5).

The biometrics-using signature generation apparatus 140 receives the second signature σ' (step 7) and generate a first signature σ with the first signing key x for the message M by performing the Key homomorphic operation KHom(Δ,σ') to the second signature σ' (step 8). If the second signature σ' is given by Equation (54), the first signature σ is given by $$\sigma \leftarrow \mathrm{Sign}(x, M) \tag{56}$$

If the second signature σ' is given by Equation (55), the first signature σ is given by $$\sigma \leftarrow \mathrm{Sign}(x, (ID, M)) \tag{57}$$

Here, it is indicated that an ID is a signature for a message M with the first signing key x corresponding to the ID.

The biometrics-using signature generation apparatus 140 transmits the first signature σ, the message M, and the ID to the verification apparatus 150 (step 9). The destination of the first signature σ and the message M is not limited to the verification apparatus 150, but they can be configured to be transmitted to any device (node) not shown in the drawings. It may be configured that the verification apparatus acquires and verifies pairs of a signature and a message that are transmitted to and stored in a device other than the verification apparatus 150. In this case, there is a gap in the timing of signature generation and verification, and a plurality of signatures may be verified together. The acquisition of the ID at the verification apparatus 150 or any device (node) may be done separately from the transmitting and receiving of the first signature σ and the message M.

The verification apparatus 150 receives the first signature σ, the message M, and the ID from the biometrics-using signature generation apparatus 140 (step 3) and verifies correctness of a pair of the message M and the first signature σ (Equation (56) or Equation (57)) using the verification key vk corresponding to the ID (step 4).

$$\mathrm{Verify}(vk, ID, M, \sigma) \tag{58}$$

In Equation (58), the ID means that correctness of the pair of the first signature σ and the message M is verified using the verification key vk corresponding to the ID.

Figure 8:
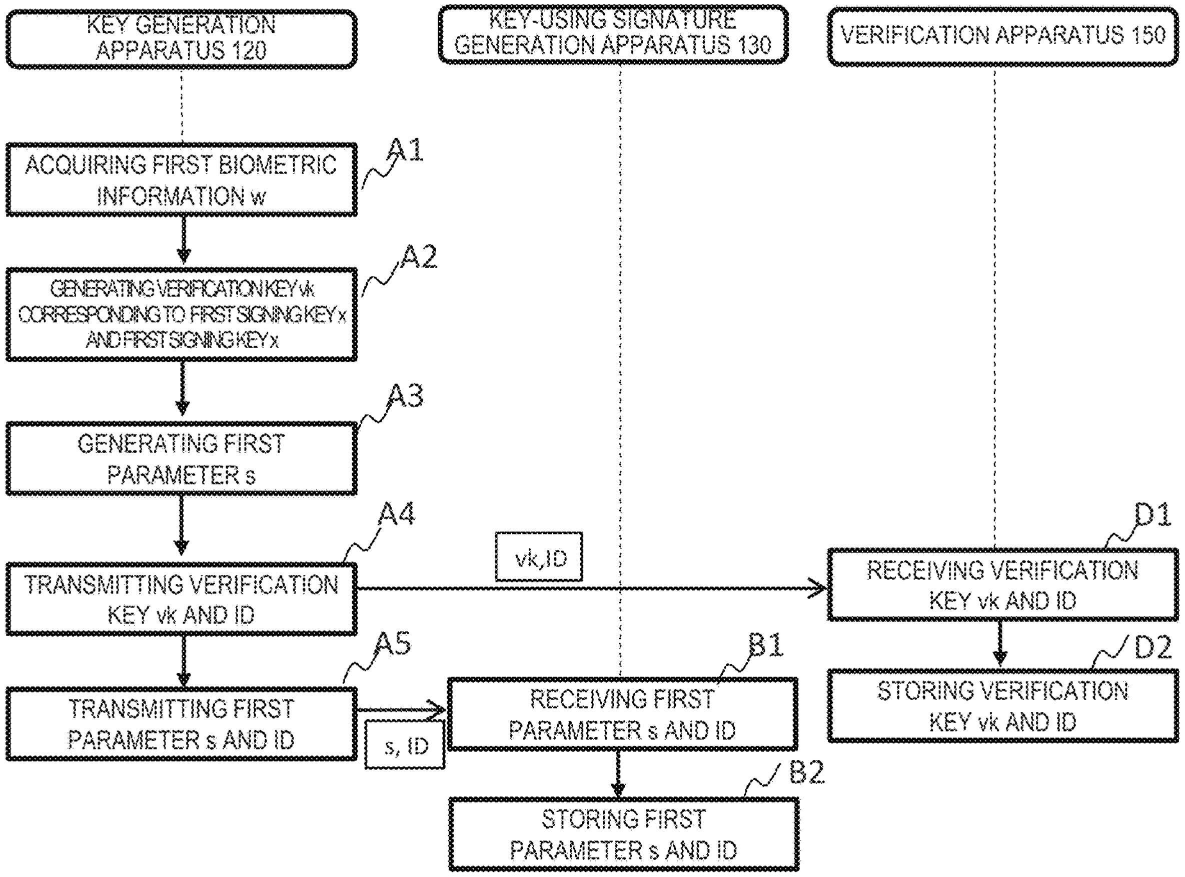
FIG. 8 is a diagram illustrating a process sequence in another one of example embodiments.

FIG. 8 is a diagram illustrating an example of processing operations in a key registration phase in the another one of example embodiments. In the following, FIG. 3 will be referred to for a configuration of each apparatus.

The biometric information acquisition part 121 in the key generation apparatus 120 acquires first biometric information w for a user (step A1).

The signing key/verification key generation part 122 generates a first signing key x and a first verification key vk (step A2).

The first parameter generation part 123 in the key generation apparatus 120 encodes the first signing key x and adds the first biometric information w to the first signing key ENC(x) encoded to generate a first parameters (=ENC(x)+w) (step A3). In the case where key generation for a plurality of IDs (accounts) for the same user is to be performed simultaneously, it may be configured that after executing step A1 to obtain the first biometric information w of the user, the key generation apparatus 120 repeats steps A2 and A3 for the number of user IDs (accounts).

The verification key transmission part 124 in the key generation apparatus 120 transmits the verification key vk and the ID generated for each ID to the verification apparatus 150 (step A4). The key generation apparatus 120 may upload the first verification keys vks and the IDs to a key server (not shown) or the like and publish it on the Internet or the like.

The first parameter transmission part 125 in the key generation apparatus 120 transmits the first parameter s generated from the same first biometric information w (first signing key x is different) for each ID to the key-using signature generation apparatus 130 together with the ID (step A5). The order of steps A4 and A5 may be interchanged.

There may be a case where the following IDs are different each other:

ID which the key generation apparatus 120 receives;

ID which the key generation apparatus 120 transmits to the key-using signature generation apparatus 130;

ID which the key-using signature generation apparatus 130 stores;

ID which the key generation apparatus 120 transmits together with the verification key; and ID which the verification apparatus 150 stores.

It is possible to use IDs in different ways. For example, what the verification apparatus 150 receives and stores together with the verification key can be information that may be disclosed as an ID (for example, hash value of the verification key vk, etc.) and what the key-using signature generation apparatus 130 stores can be information used by the user to specify each key (e.g., account). If the IDs being transmitted and received are different from the IDs being stored, there may be a case where additional computational processing (e.g., hash calculations) to correlate IDs each other is needed when storing the IDs.

Figure 11A:
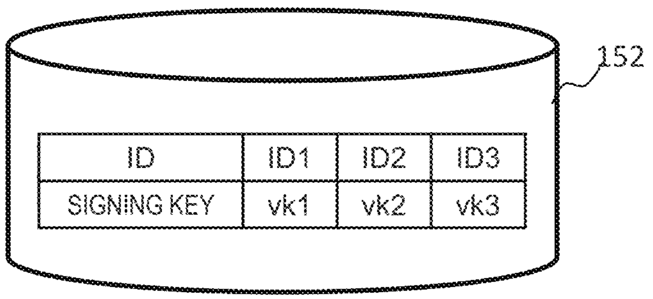
FIG. 11A, FIG. 11B, and FIG. 11C are diagrams illustrating another one of example embodiments.

The verification key reception part 151 in the verification apparatus 150 receives the verification key vk and the ID (step D1) and stores the verification key vk and the ID in the storage part 152 (step D2). For example, as illustrated in FIG. 11A, they may be stored in the storage part 152 as a table that associates the verification key vk with the ID. Although, in FIG. 11A, a table of correspondence between the verification key vk and the ID (account) for one user is illustrated, it is of course possible to manage the verification key vk and the ID not on a per-user basis.

The verification key reception part 151 in the verification apparatus 150 may acquire and store the verification key vk and the ID from a key server (not shown) that has registered the verification key.

Figure 11B:
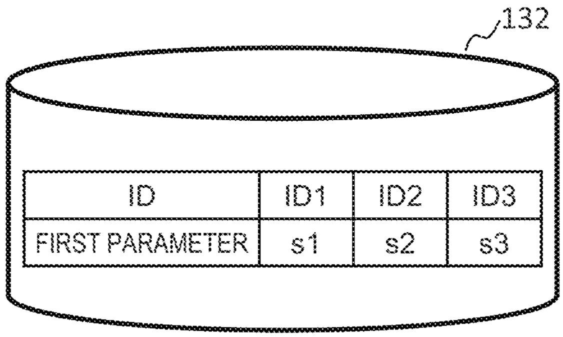

The first parameter reception part 131 in the key-using signature generation apparatus 130 receives the first parameter s and the ID (step B1) and stores them in the storage part 132. (step B2). For example, as illustrated in FIG. 11B, they may be stored in the storage part 152 in a table format that associates the first parameter s with the ID. In FIG. 11B, a table of correspondence between the first parameter s and the ID (account) for one user is illustrated. It is possible to manage this table of correspondence on a per-user basis.

Figure 9:
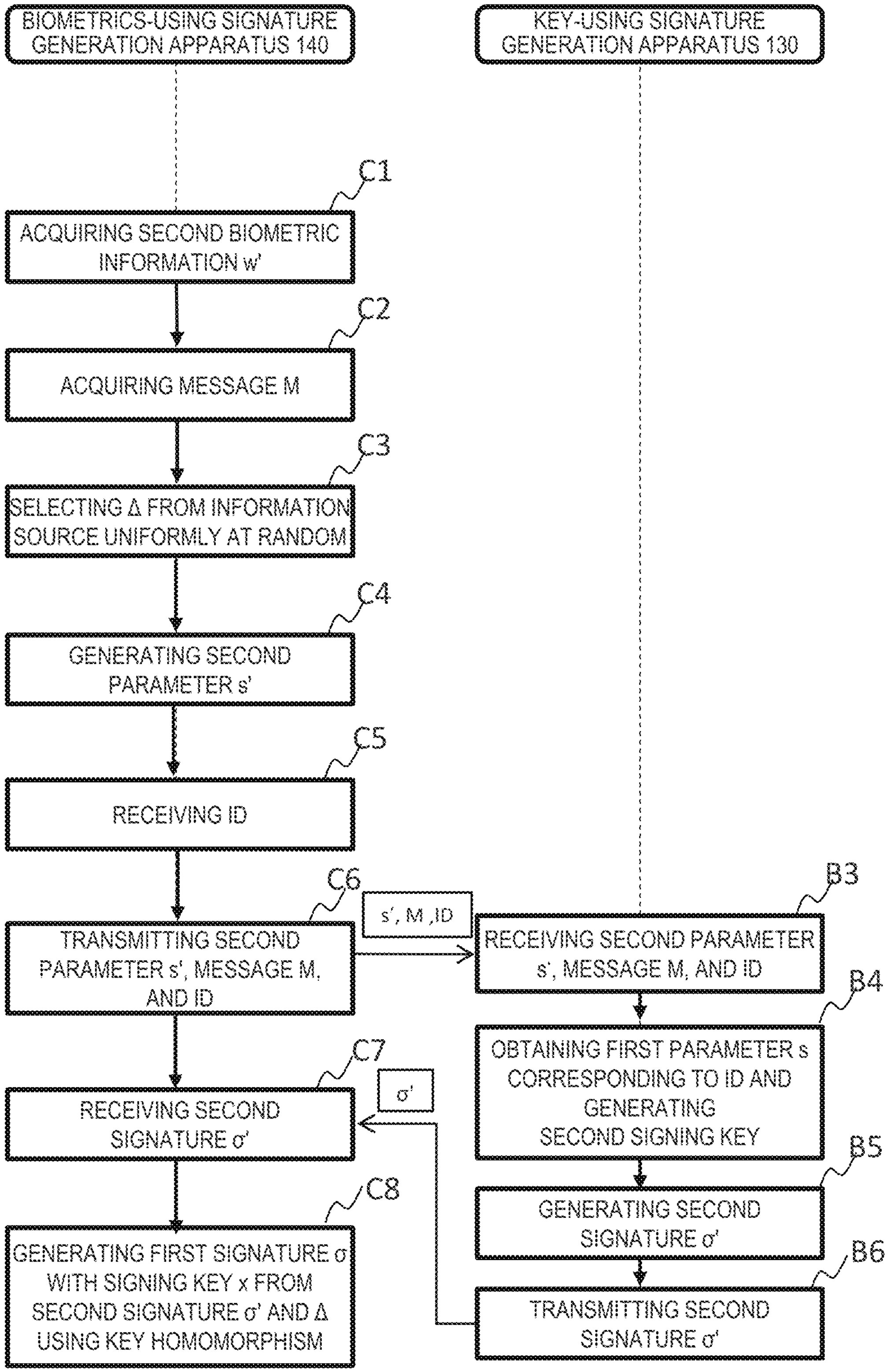
FIG. 9 is a diagram illustrating a process sequence in another one of example embodiments.

FIG. 9 is a diagram illustrating an example of a processing operation of signature creation phase in the another one of example embodiments.

In the biometrics-using signature generation apparatus 140, an acquisition of second biometric information w' of user (step C1), an acquisition of a message M to be signed (step C2), a generation of a differential key (step C3), and a generation of a second parameter s'(=ENC(Δ)+w') (step C4) are the same as those in FIG. 5 referenced in the description of the first example embodiment.

The second parameter/message transmission part 1443 in the biometrics-using signature generation apparatus 140 receives an ID (account) of the user inputted from an input device (not shown) (step C5) and transmits the second parameter s', the message M to be signed and the ID (account) to the key-using signature generation apparatus 130 (step C6).

The second parameter/message reception part 1341 in the key-using signature generation apparatus 130 receives the second parameter s', the message M to be signed and the ID transmitted from the biometrics-using signature generation apparatus 140 (step B3).

The second signing key generation part 1342 in the key-using signature generation apparatus 130 obtains the first parameter s corresponding to the ID from the storage part 312 and sets the value DEC(s−s') as the second signing key x' (step B4). The value (DEC(s−s')) is obtained by decoding the difference s−s' between the first parameter s and the second parameter s'.

The second signature generation part 1343 in the key-using signature generation apparatus 130 uses the second signing key x' to generate a second signature σ'=Sign(x',M) for the message M or a second signature σ'=Sign(x'(ID,M)) for the message M and the ID (step B5). As mentioned above, the signature for the message M and the ID is not limited to the above, but the way to concatenate the ID and the message M can be arbitrary, such as concatenating the ID and the message M as they are, or hashing the ID and the message M individually and concatenating their hash values.

The second signature transmission part 1344 in the key-using signature generation apparatus 130 transmits the second signature σ' to the biometrics-using signature generation apparatus 140 (step B6).

The second signature reception part 1444 in the biometrics-using signature generation apparatus 140 receives the second signature σ' transmitted from the key-using signature generation apparatus 130 (step C7).)

The first signature generation part 1445 in the biometrics-using signature generation apparatus 140 uses the second signature σ' and the differential key Δ to generate first signature σ=Sign(x,M) or σ=Sign(x, (ID, M)) with the first signing key x, from the second signature σ' for the message M with the second signing key x' by performing Key homomorphic operation KHom(Δ,σ') thereto.

Figure 10:
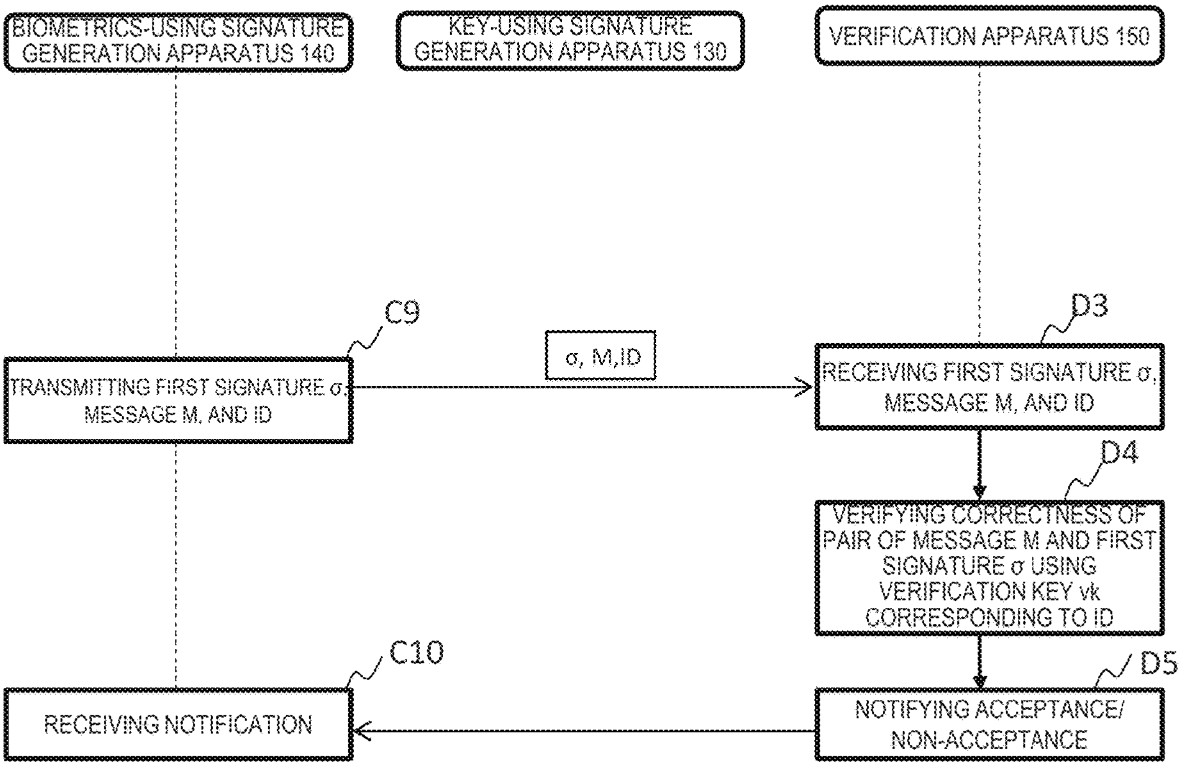
FIG. 10 is a diagram illustrating a process sequence in another one of example embodiments.

FIG. 10 is a diagram illustrating an example of a processing operation of signature verification phase in the another one of example embodiments. The transmission part 145 in the biometrics-using signature generation apparatus 140 transmits the first signature σ, the message M, and the ID to the verification apparatus 150 (step C9). The signature/message reception part 153 in the verification apparatus 150 receives the first signature σ, the message M, and the ID transmitted from the biometrics-using signature generation apparatus 140 (step D3). The verification apparatus 150 may obtain the ID by a manner other than receiving the ID transmitted from the biometrics-using signature generation apparatus 140 directly (e.g., obtain from a key server, etc.).

The signature verification part 154 in the verification apparatus 150 obtain the verification key vk corresponding to the ID from the storage part 152 to verify the message M and the first signature σ. (correctness of the pair of the message M and the first signature σ) (step D4).

Step D5 performed by the verification apparatus 150 and step C10 performed by the biometrics-using signature generation apparatus 140 are similar to steps D5 and C9 in FIG. 6 and therefore explanations are omitted.

Figure 11C:
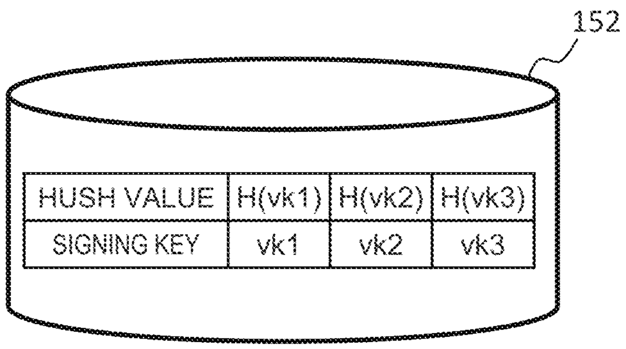

It may be configured that in the storage part 152 of the verification apparatus 150, a hash value (H(vk)) of the verification key vk is stored as the ID illustrated in FIG. 11A, as illustrated in FIG. 11C. The signing key/verification key generation part 122 in the key generation apparatus 120 transmits the verification keys vks and the hash values of the verification keys vk for the number of user IDs (accounts) to the verification apparatus 150, and the verification apparatus 150 stores the verification keys vk and their hash values (H(vk)) in the storage part 152. The transmission part 145 in the biometrics-using signature generation apparatus 140 transmits a hash value (H(vk)) corresponding to the first signature σ, the message M and the ID to the verification apparatus 150 in C9 FIG. 10. The step of signature/message reception part 153 in the verification apparatus 150 receives the first signature σ, the message M and the hash value (H(vk)) transmitted from the biometrics-using signature generation apparatus 140 (step D3). The signature verification part 154 in the verification apparatus 150 obtains the verification key vk corresponding to the hash value (H(vk)) from the storage part 152 to verify correctness of a pair of the message M and the first signature σ using the verification key vk (step D4). It may be configured that the biometrics-using signature generation apparatus 140 obtains the correspondence between the ID and the hash value (H(vk)) of the verification key vk from the signing key/verification key generation part 122 to store it in a storage part (not shown).

In a communication protocol according to the present example embodiment, for a communication in which the key-using signature generation apparatus 130 transmits the second parameter s', the message M and the ID transmitted by the biometrics-using signature generation apparatus 140, the key-using signature generation apparatus 130 returns one second signature σ' generated b y the key-using signature generation apparatus 130 to the biometrics-using signature generation apparatus 140. Therefore, even if the key-using signature generation apparatus 130 commits a fraudulent such as generating and returning a plurality of second signatures corresponding to a plurality of first parameters s, for the transmission of the second parameter s', the message M and the ID by the biometrics-using signature generation apparatus 140, the biometrics-using signature generation apparatus 140 may notice the fraudulent before generating signatures and can take action such as terminating signature generation.

Figure 12:
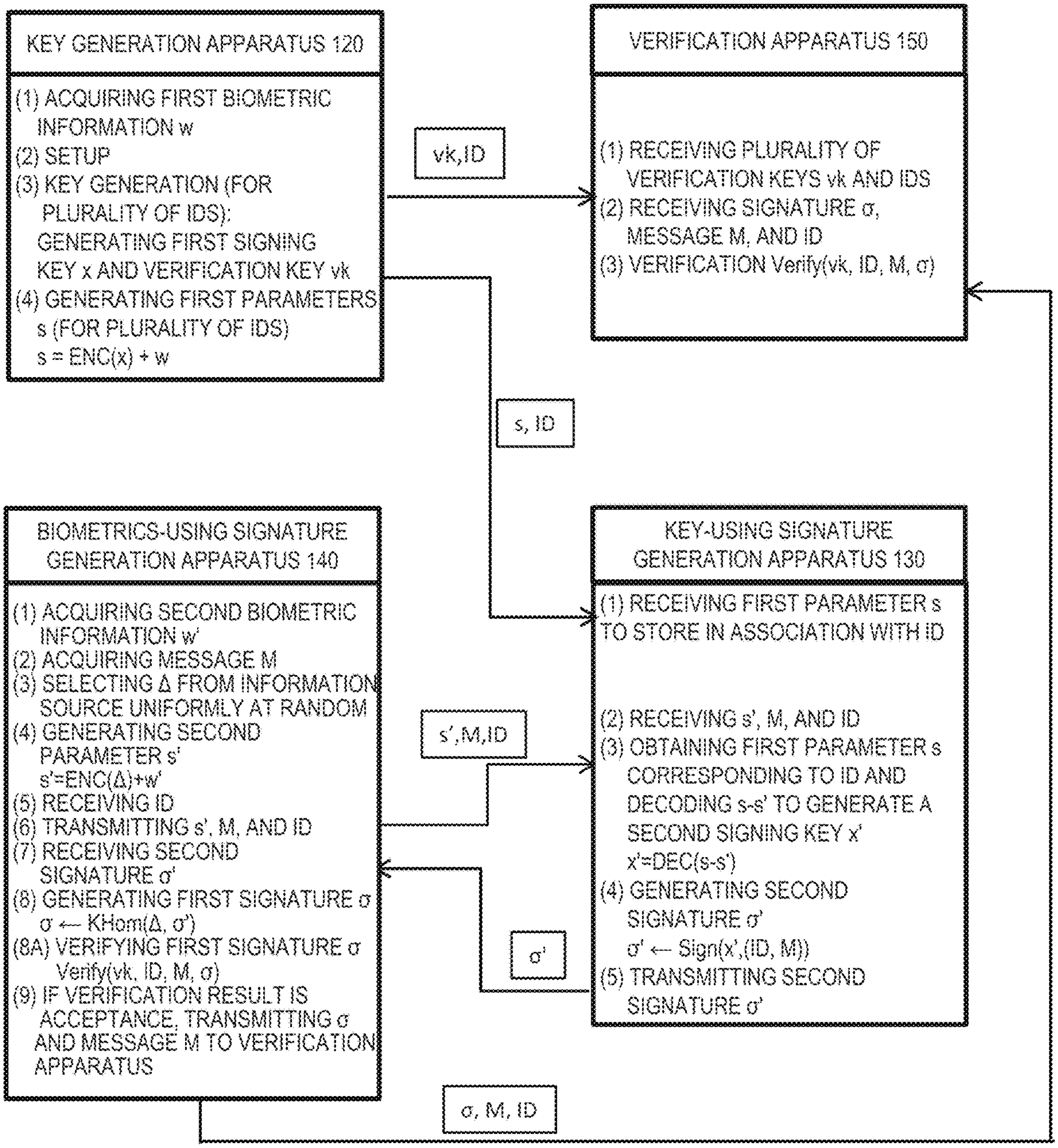
FIG. 12 is a diagram illustrating an operation process in yet another one of example embodiments.

FIG. 12 is a diagram illustrating an example of operations of a digital signature system 100 in the third example embodiment. The difference from those illustrated in FIG. 7 referred to in the description of the second embodiment is that in this embodiment, the biometrics-using signature generation apparatus 140 performs a process (8A): Verify (vk,ID,M,σ) additionally between the process (8) and the process (9). The process (8) is a process generating the first signature σ. The process (9) is a process transmitting the first signature σ, the message M and the ID to the verification apparatus 150. The process (8A) is a process verifying the first signature σ, which is used when verifying correctness of the pair of the message M and the first signature σ (Equation (56) or Equation (57)) using the verification key vk corresponding to the ID. A correspondence between the verification key vk and the ID is transmitted in advance from the key generation apparatus 120 to the biometrics-using signature generation apparatus 140. It may also be provided with a storage part that stores the correspondence between the verification key and the key ID, as illustrated in FIG. 11A. The biometrics-using signature generation apparatus 140 may receive the correspondence between the verification key and the key ID from a key server or other source.

Figure 13:
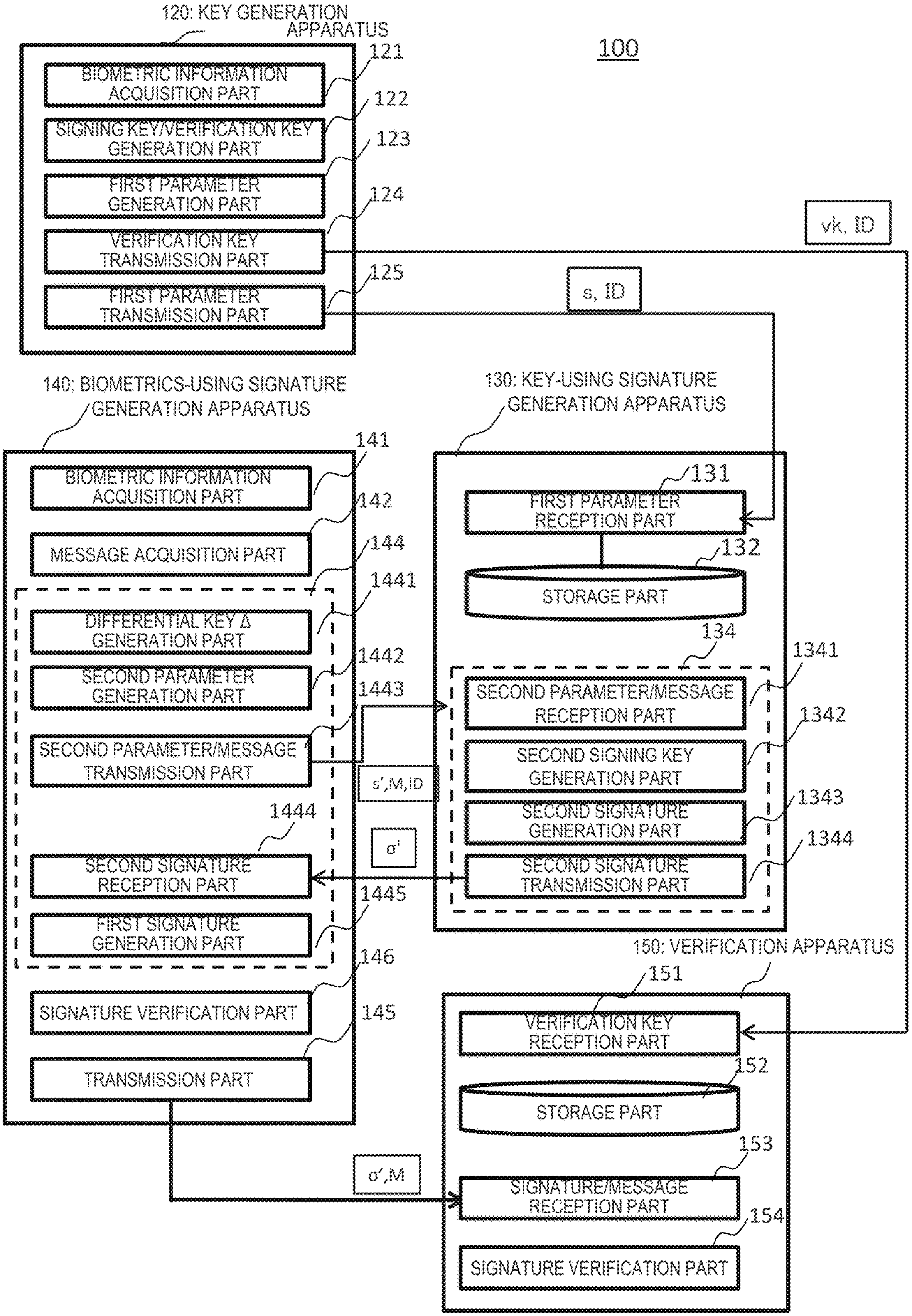
FIG. 13 is a diagram illustrating a configuration in the yet another one of example embodiments.

FIG. 13 is a diagram illustrating an example of a configuration of each apparatus according to the third example embodiment. In contrast to the example illustrated in FIG. 3, the biometrics-using signature generation apparatus 140 is provided with a signature verification part 146. The key generation apparatus 120, the key-using signature generation apparatus 130, and the verification apparatus 150 are similar to the configuration illustrated in FIG. 3.

Figure 14:
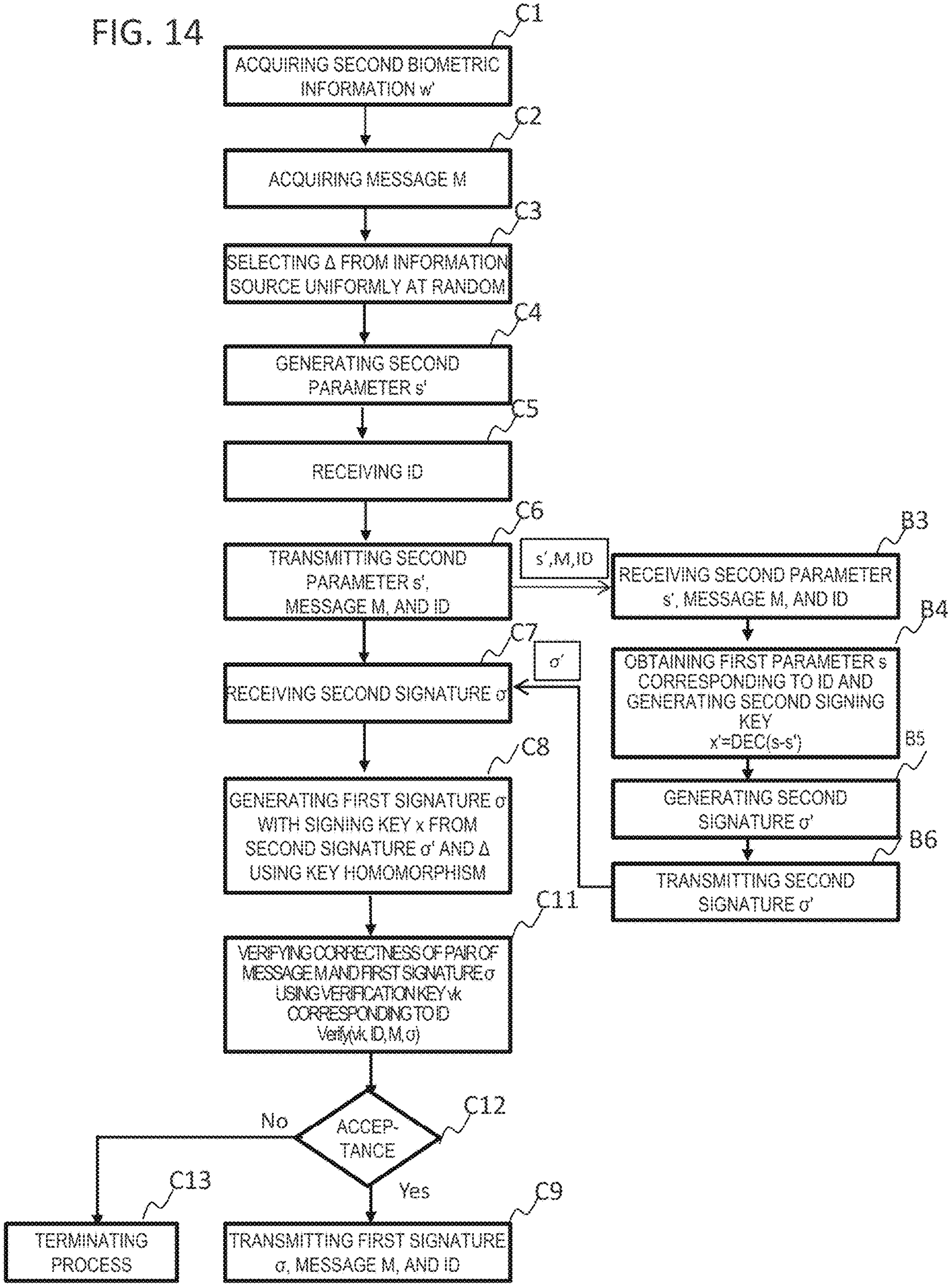
FIG. 14 is a diagram illustrating a process sequence in the yet another one of example embodiments.

FIG. 14 is a diagram illustrating an example of a processing operation of signature creation phase in the third example embodiment. In the third embodiment, the processing operation in a key registration phase and a signature verification is the same as in the examples illustrated in FIG. 8 and FIG. 10.

In FIG. 14, steps C1 to C8 performed by the biometrics-using signature generation apparatus 140 and steps B3 to B6 performed by the key-using signature generation apparatus 130 are similar to steps C1 to C8, and steps B3 to B6 in FIG. 9, respectively, and therefore explanations are omitted. The biometrics-using signature generation apparatus 140 obtains a verification key vk corresponding to the ID from the storage part 152 to verify correctness of a pair of the message M and the first signature σ using the verification key vk (C11).

If a verification result of the first signature σ is acceptance (Yes in step C12), the biometrics-using signature generation apparatus 140 transmits the first signature σ, the message M and the ID to the verification apparatus 150 (C9). If a verification result of the first signature σ is non-acceptance (No in step C12), the biometrics-using signature generation apparatus 140 terminates a process (C13). In this case, a set of the first signature σ, the message M and the ID are not transmitted to the verification apparatus 150.

If the verification result of the first signature σ is acceptance (Yes in C12), the signature/message reception part 153 in the verification apparatus 150 receives the first signature σ, the message M and the ID transmitted from the biometrics-using signature generation apparatus 140 (step D3 in FIG. 10). The signature verification part 154 in the verification apparatus 150 obtains the verification key vk corresponding to the ID from the storage part 152 to verify correctness of a pair of the message M and the first signature σ using the verification key vk (step D4 in FIG. 10).

The final processing for completion of the signature is performed by the biometrics-using signature generation apparatus 140 on the user side. Then, the biometrics-using signature generation apparatus 140 verifies the signature generated before transmitting the signature to the verification apparatus 150. This allows the biometrics-using signature generation apparatus 140 to detect any fraudulent performed by the key-using signature generation apparatus 130. For example, if the key-using signature generation apparatus 130 generates a second signing key x' and a second signature σ' using a first parameter other than a first parameter s1 specified with ID=1, the biometrics-using signature generation apparatus 140 can detect this. As a variation example of the third example embodiment, it may be configured that the biometrics-using signature generation apparatus 140 in FIG. 2 referred to in the description of the first embodiment above, performs a process corresponding to the process (8A in FIG. 12) additionally between the process (7) and the process (8). The process (7) is a process generating the first signature σ. The process (8) is a process transmitting the first signature σ to the verification apparatus 150. The process (8A) is a process verifying the first signature σ.

Figure 15:
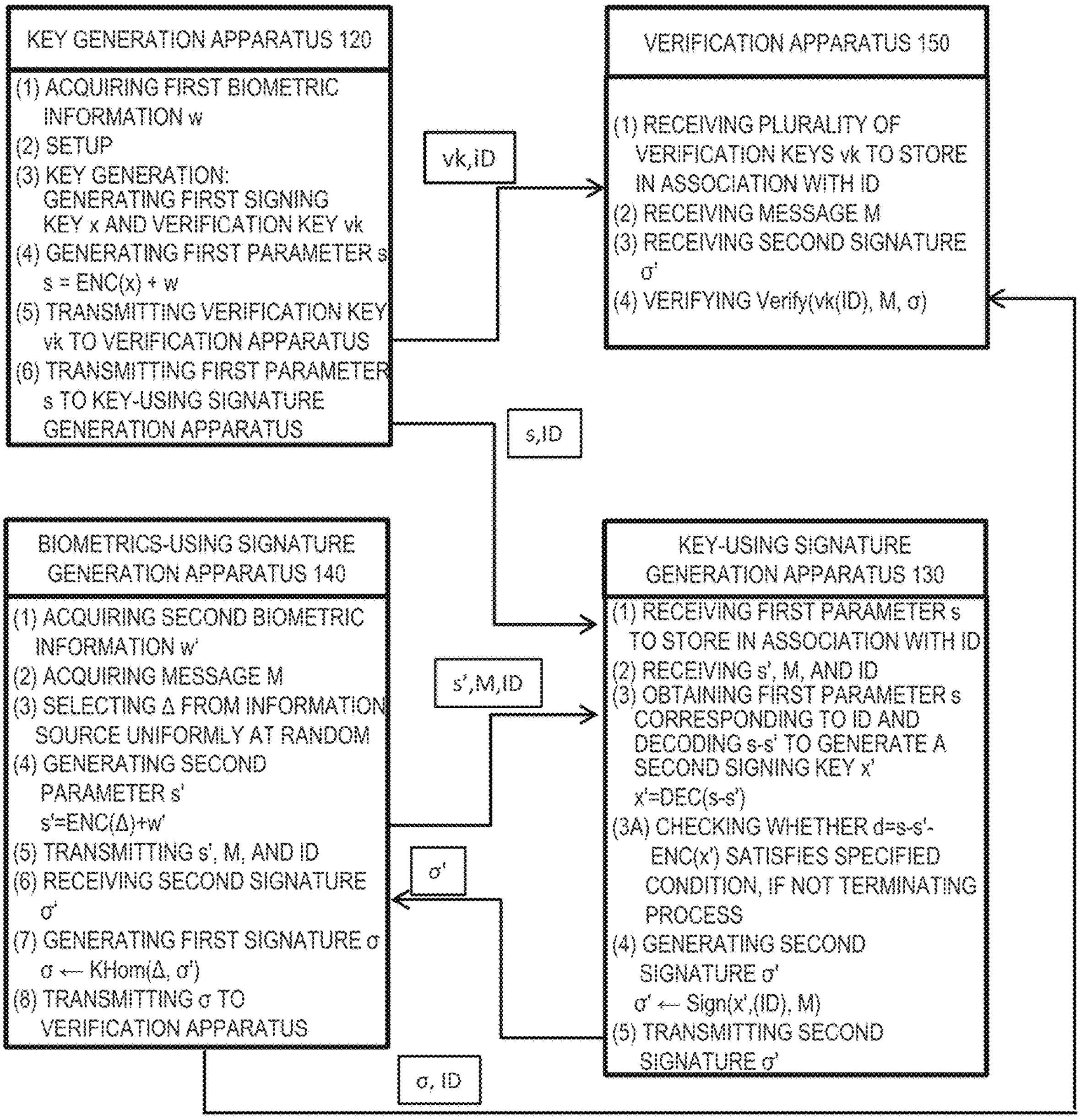
FIG. 15 is a diagram illustrating an operation process in a further one of example embodiments.

FIG. 15 is a diagram illustrating an example of operations of a digital signature system 100 in the fourth example embodiment. The difference from those illustrated in FIG. 7 referred to in the description of the second embodiment is that in this embodiment, key-using signature generation apparatus 130 performs a process (3A) additionally between a process (3) and a process (4). The process (3) is a process generating a second signing key x' by decoding a difference between a first parameter s and a second parameter s'. The process (4) is a process generating a second signature σ'. The process (3A) is a process calculating $$d = s - s' - ENC(x') \tag{59}$$

and checking whether a value corresponding to a difference between first biometric information w and second biometric information w' satisfies a predetermined specified condition.

If the difference first between biometric information w and second biometric information w' is less than or equal to an error correction capability of a linear code, the operation result of Decode (s–s) in Equation (43) becomes $$x' = x - \Delta \tag{60}$$

due to linear coding.

The key-using signature generation apparatus 130 checks whether or not d in Equation (59) satisfies the specified condition as a further verification, and rejects (terminates the process) if d does not satisfy the specified condition. The specified condition is, for example, such that a similarity (e.g., Euclidean distance or cosine similarity) between the first biometric information w and the second biometric information w' is within a predetermined specific range. The reason for rejecting the norm of d when it does not satisfy the specified condition is as follows.

Figure 18:
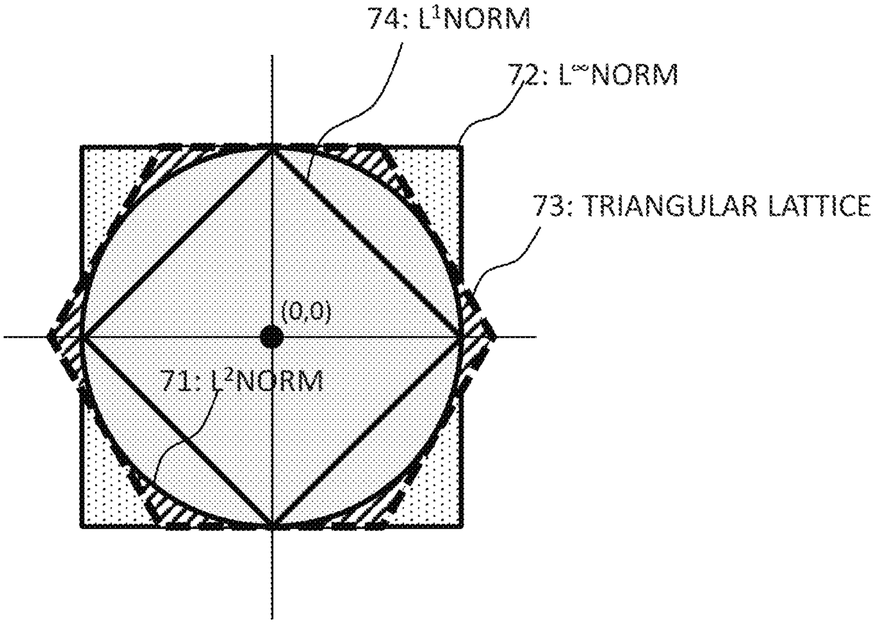
FIG. 18 is a diagram illustrating the one of example embodiments.

If a range of biometric information that should be evaluated as biometric information of the same person differs from the difference (d) between two biometric information which can be absorbed by the correction capability of the error correction coding, the difference between the two biometric information may be absorbed by the correction capability of the coding, even though a signature has been generated using biometric information that should be evaluated as a person different from a person whose biometric information has been used at the time of key generation. In a such case, accepting the signature can be avoided by adding the rejection process of the norm of d. The following describes as a non-limiting example, with reference to FIG. 18, an example, in which a biometric information is a two-dimensional vector and the Euclidean distance ($L^2$ norm of a difference vector) is used as a similarity between the two vectors of biometric information. If the origin (black point in the center) is the first biometric information w, a range of biometric information that should be determined as the biometric information of the same person is inside a circle (71) where the Euclidean distance between the two biometric information is within a specific range in FIG. 11. On the other hand, a difference that is absorbed when the difference of the biometric information is evaluated by the Chebyshev distance ($L^\infty$ norm of the difference) is inside a square (72) in FIG. 18. Therefore, biometric information in an area inside the square (72) and outside the circle (71) of the Euclidean distance ($L^2$ norm) is evaluated to be a signature by a person himself/herself, since the difference is absorbed in the biometric signature, etc., even though it is not the biometric information of the same person as the first biometric information w at the origin. A difference that is absorbed when the difference of biometric information is evaluated by the triangular lattice is inside a hexagon (73) in FIG. 18. The same occurs as in $L^\infty$ norm case. The difference in range between the Euclidean distance and the $L^\infty$ norm etc., may extend in higher dimensions.

The Manhattan distance ($L^1$ norm of a difference vector) can be used as a similarity between the two vectors of biometric information. If the origin (black point in the center) is the first biometric information w, a range of biometric information that should be determined as the biometric information of the same person is inside a diamond (74) where the Manhattan distance between the two biometric information is within a specific range in FIG. 18. On the other hand, a difference that is absorbed when the difference of the biometric information is evaluated by the Chebyshev distance ($L^\infty$ norm of the difference) is inside a square (72) in FIG. 18. Therefore, biometric information in an area inside the square (72) and outside the diamond (74) of the Euclidean distance ($L^2$norm) is evaluated to be a signature by a person himself/herself, since the difference is absorbed in the biometric signature, etc., even though it is not the biometric information of the same person as the first biometric information w at the origin. A difference that is absorbed when the difference of biometric information is evaluated on the triangular lattice is inside a hexagon (73) in FIG. 18. The same occurs as in $L^\infty$ norm case. The difference in range between the Manhattan distance and the $L^\infty$ norm etc. is more extensive in higher dimensions.

The key-using signature generation apparatus 130 cannot know two biometric information, the first biometric information w and the second biometric information w' (not even other apparatuses 120, 140, and 150 can know). It is not possible to separate an encoded key ENC(x) and the first biometric information w from each other from the first parameter s, in which the encoded key ENC(x) is embedded in the first biometric information w. Similarly, it is not possible to separate an encoded key ENC(Δ) and the second biometric information w' from the second parameter s'. Therefore, the key-using signature generation apparatus 130 calculates din Equation (59) and rejects it if the d does not satisfy the specified condition. Since individual values of ENC(x), ENC(Δ), and ENC(x–Δ) are not given to the key-using signature generation apparatus 130, it cannot know these values directly. Therefore, the key-using signature generation apparatus 130 calculates $$d = s - s' - ENC(x') \tag{61}$$

using a value ENC(x'), which is an encoding value of the second signature x' and is reconstructed by the second signing key generation part 1342 in the key-using signature generation apparatus 130.

From Equation (60), Equation (61) becomes $$d = s - s' - ENC(x') = s - s' - ENC(x - \Delta) \tag{62}$$

expanding s and s', and due to the linearity of the code, the following holds.

$$d=(d_1, \ldots, d_n)= \quad (63)$$
$$(w_1, \ldots, w_n)+ENC(x)\{(w'_1, \ldots, w'_n)+ENC(\Delta)\}-ENC(x-\Delta)=$$
$$(w_1, \ldots, w_n)-(w'_1, \ldots, w'_n)+ENC(x-\Delta)-ENC(x-\Delta)=$$
$$(w_1-w'_1, \ldots, w_n-w'_n)$$

That is, under linear code, d in Equation (61) corresponds to a difference (vector subtraction) between n-dimensional vectors of the first biometric information w and the second biometric information w'. The key-using signature generation apparatus 130 verifies whether or not the difference between the first biometric information w and the second biometric information w' satisfies predetermined specified condition.

The specified condition may be that $L^2$norm of difference d between the first biometric information w and the second biometric information w' is within a specified range. The $L^2$norm L2(d) of d corresponds to a distance between the vectors of the first biometric information w and the second biometric information w'.

$$L2(d)=\sqrt{\Sigma_{i=1}^{n} d_i^2}=\sqrt{\Sigma_{i=1}^{n}(w_i-w'_i)^2} \quad (64)$$

If L2(d) is less than or equal to a predetermined specified threshold value (L2(d)≤Th), the key-using signature generation apparatus 130 generates a second signature σ' for the message M using a second signing key x' (=DEC(s−s')) (4) and transmits the second signature σ' to the biometrics-using signature generation apparatus 140 (5).

The specified condition may be that $L^1$norm of difference d between the first biometric information w and the second biometric information w' is within a specified range. In this case, the key-using signature generation apparatus 130 calculates L'norm of d as follows instead of Equation (64).

$$L1(d)=\Sigma_{i=1}^{n}|d_i|=\Sigma_{i=1}^{n}|w_i-w'_i| \quad (65)$$

Then, it checks whether or not L1 (d) is less than or equal to a predetermined specified threshold value Th. If L1(d) is less than or equal to the specified threshold value Th, the key-using signature generation apparatus 130 generates a second signature σ' for the message M using a second signing key x' (=DEC(s−s')) (4) and transmits the second signature σ' to the biometrics-using signature generation apparatus 140 (5).

According to the present example embodiment, the value corresponding to a difference w−w' between the first biometric information w and the second biometric information w' is calculated from the first parameter s generated from the first biometric information w and the second parameter s' generated from the second biometric information w', then, it is verified whether or not the value satisfies the predetermined specified condition. These allow an accuracy of checking whether or not the first biometric information w and the second biometric information w' belong to the same person to be improved.

Figure 16:
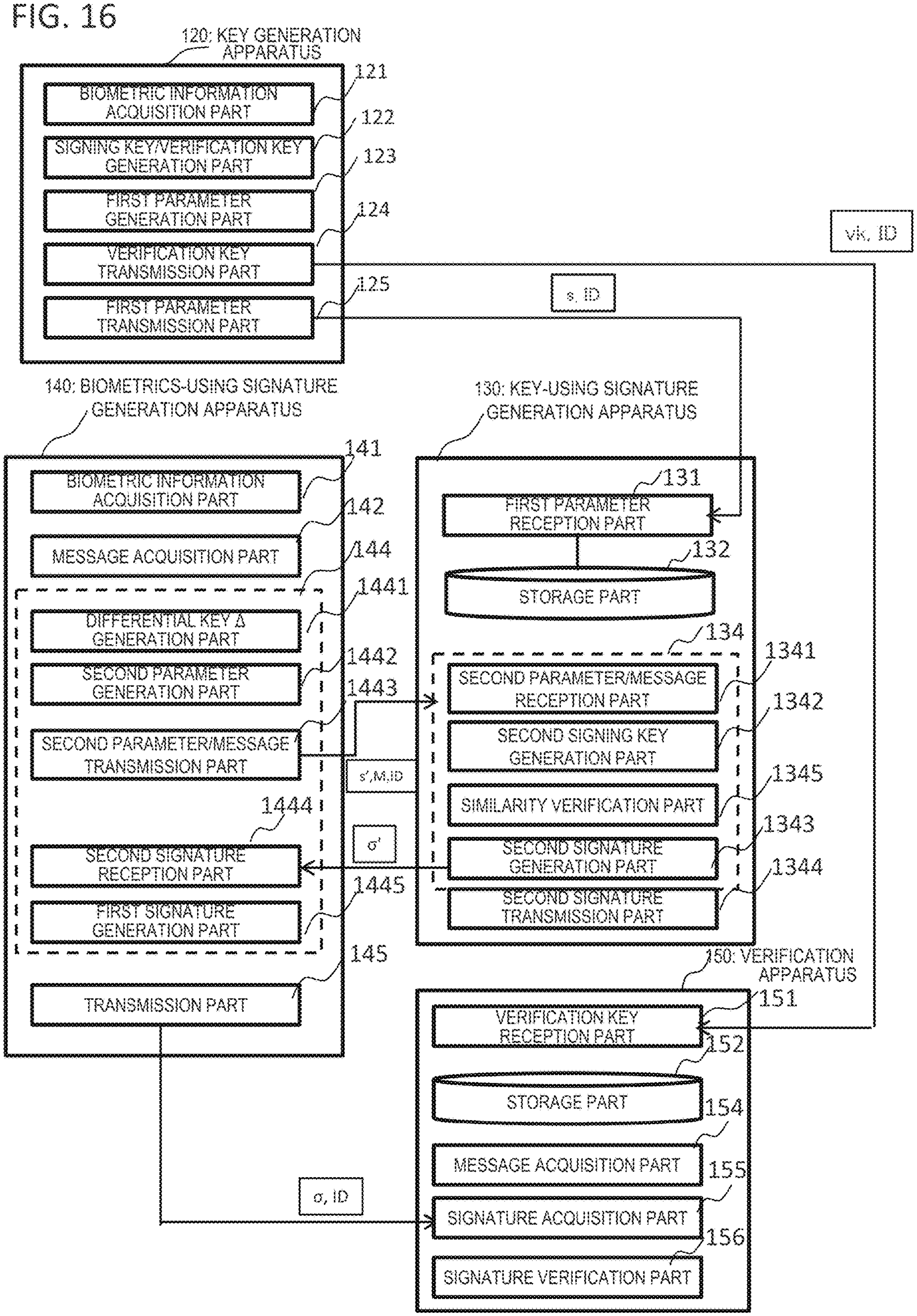
FIG. 16 is a diagram illustrating a configuration in the further one of example embodiments.

FIG. 16 is a drawing schematically illustrating an example of the configuration of each device in the fourth example embodiment. In the present example embodiment, the key-using signature generation apparatus 130 is provided with a similarity verification part 1345 in addition to a configuration (illustrated in FIG. 3) of the another one of example embodiments. A configuration and processing of the key generation apparatus 120, the biometrics-using signature generation apparatus 140, and the verification apparatus 150 are the same as in the second embodiment described above. The similarity verification part 1345 obtains the first parameter s and the second parameter s' and checks whether or not a difference between the first biometric information w and the second biometric information w' satisfies a specified condition. The specified condition may be such that norm of difference vector is within a specified range. In such cases, $L^2$ norm, for example, may be used as norm. As an example, the similarity verification part 1345 obtains the first parameter s and the second parameter s' and calculates the $L^2$ norm L2(d) (Equation (64)) of the difference between the first biometric information w and the second biometric information w' (d=s−s'−ENC(x')) using the second signing key x' generated by the second signing key generation part 1342 to verify whether or not L2(d) is less than or equal to a specified threshold value Th.

Figure 17:
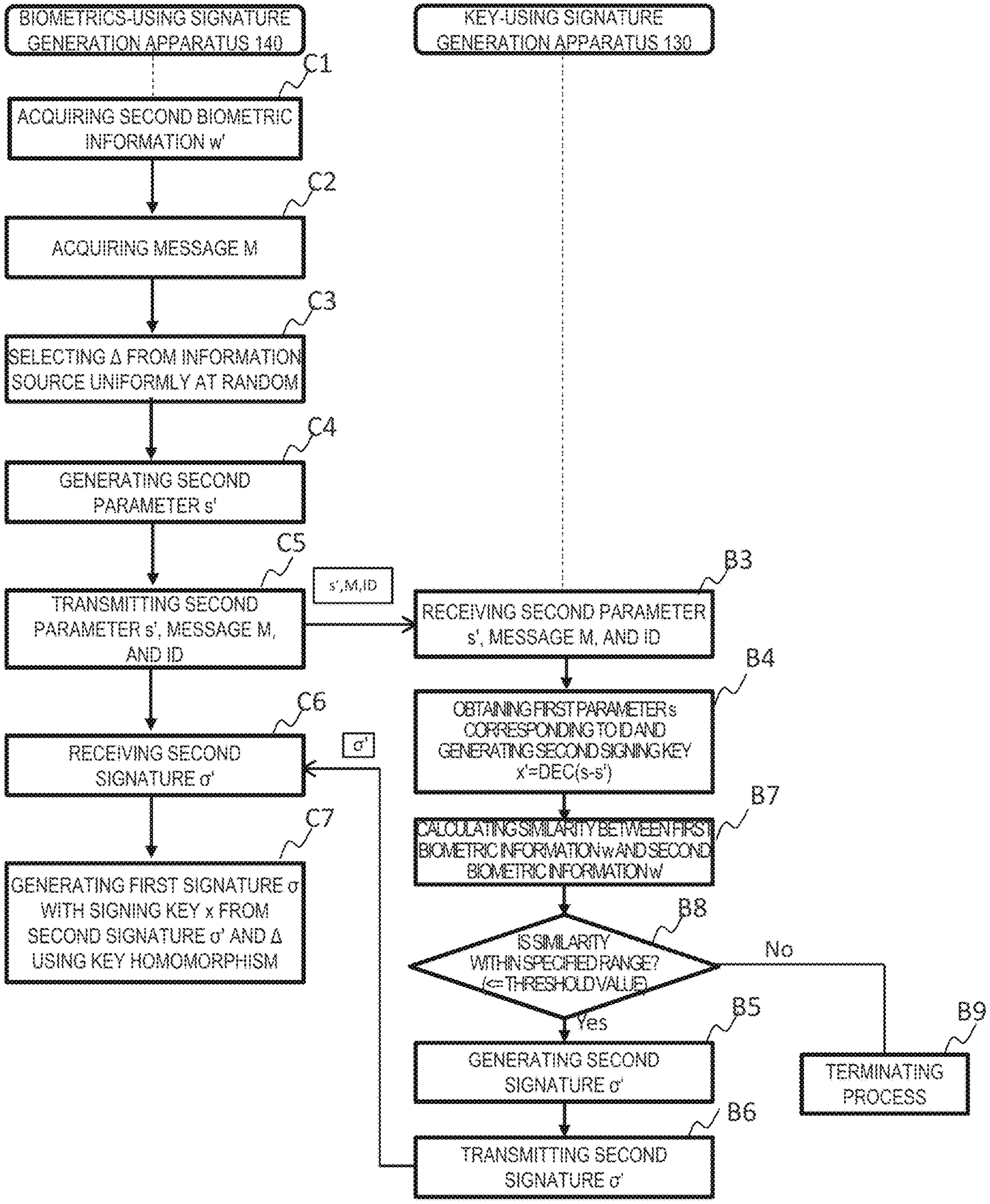
FIG. 17 is a diagram illustrating a process sequence in the further one of example embodiments.

FIG. 17 is a diagram illustrating an example of a processing operation of signature creation phase in the fourth example embodiment. In the fourth embodiment, the processing operation in a key registration phase and a signature verification is the same as the examples illustrated in FIG. 8 and FIG. 10 referred to in the description of the another one of example embodiments. The difference between the present example embodiment and those illustrated in FIG. 9 referred to in the description of the second embodiment is that, in this embodiment a verification whether or not a difference between the first biometric information w and the second biometric information w' satisfies a specified condition (step B7) is performed between a generation process of the second signing key x' (step B4) and a generation process of the second signature σ' (step B5), as illustrated in FIG. 17. If it satisfies the specified condition (Yes branch in step B8), the generation process of the second signature σ' (step B5) is performed. If it does not satisfy the specified condition (No branch in step B8), the process is terminated (step B9).

As a variation example of the fourth example embodiment, steps B7 and B8 in FIG. 17 may be inserted between the generation process of the second signing key x' (step B4) and the generation process of the second signature σ' (step B5) in FIG. 5, referred to in the description of one embodiment above. That is, it may be configured that the key-using signature generation apparatus 130 in FIG. 2, referred to in the description of the first example embodiment, performs additionally a process checking whether or not a value d corresponding to the first biometric information w and the second biometric information w' satisfies a predetermined specified condition (3A in FIG. 15), between a process (3) and a process (4). The process (3) is a process generating a second signing key x' by decoding a difference between the first parameter s and the second parameter s'. The process (4) is a process generating a second signature σ'.

In the first to fourth example embodiments, an algorithm of the Key homomorphic operation may be, besides σ←KHom(Δ,σ) corresponding to the signature algorithm, an algorithm including Δ, σ and message M as in Equation (66) (Non-Patent Document 2:4.7 Randomizable SPS by Abe et al.), or an algorithm including Δ, σ and M with the verification key vk, as in Equation (67) (Non-Patent Document 2:4.8 Ghadafi's Short SPS). The key homomorphic operation algorithm converts the second signature σ' for the message M with the second signing key x' to the first signature σ for the message M with first signing key x(=x'+Δ). to the first signature σ for message M with first signing key x(=x'+Δ).

$$\sigma \leftarrow KHom(\Delta, \sigma', M) \quad (66)$$

$$\sigma \leftarrow KHom(\Delta, \sigma', M, vk) \quad (67)$$

In the following, another non-limiting example of the first to third example embodiments described above is the case where the biometric information is binary coded to binary data.

Number of bits in code word: n

Number of error bits allowed: D

The first parameter generation part 123 in the key generation apparatus 120 encodes the first signing key x and generates a first parameter s. The first parameter s is generated by calculating bitwise exclusive OR (xor of the first signing key ENC(x) encoded and the first biometric w (n-bit binary data).

$$s := ENC(x)\,x \text{ or } w \quad (68)$$

The first parameter generation part 123 inputs the first signing key x (L bits) to the error correction encoding algorithm (Encode), executes thereof to obtain an encoded key c (n bits).

$$c = [c_1, \ldots, c_n] \leftarrow \text{Encode}(x) \quad (69)$$

Here, ci(i=1, . . . n) is a value of the i-th bit of c.

The encoded key c according to an error correction coding may have n bits as the sum of length of information bits and length of code bits. For example, in the Hamming code, code length is to be $n=2^k-1$, and the length of information bits is to be L=n−k.

Next, the first parameter generation part 123 calculates the bitwise exclusive OR of the first biometric information w (n bits) and the encoded key c to output a result thereof as the first parameter s (n bits).

$$s := w\,x \text{ or } c = [w_1\,x \text{ or } c_1, w_n\,x \text{ or } c_n] \quad (70)$$

The second parameter generation part 1442 in the biometrics-using signature generation apparatus 140 generates the second parameter s' from a result of calculating bitwise exclusive OR of the encoded value ENC(Δ) of the differential key Δ and the second biometric information w' (step C4 in FIG. 5).

$$s' := ENC(\Delta)\,x \text{ or } w' \quad (71)$$

The second parameter generation part 1442 inputs the differential key Δ (L bits) to the error correction encoding algorithm (Encode), executes thereof to obtain an encoded key c of n bits, as a result. As mentioned above, in the case of the Hamming code, the length of the code word (information bits+code bits) is to be $n=2^k-1$ (k is 3 or more integers) and the length of the information bits is to be L.

$$c' = [c'_1, \ldots, c'_n] \leftarrow \text{Encode}(\Delta) \quad (72)$$

Here, c'i(i=1, . . . n) is a value of the i-th bit of c'.

Next, the second parameter generation part 1442 calculates the bitwise exclusive OR of the second biometric information w' (n bits) and the encoded key c' to output a result thereof as the second parameter s' (n bits).

$$s' \leftarrow w'\,x \text{ or } c = w'_1\,x \text{ or } c'_1, w'_2\,x \text{ or } c'_2, \ldots, w'_n\,x \text{ or } c'_n] \quad (73)$$

The second parameter/message transmission part 1443 in the biometrics-using signature generation apparatus 140 transmits the second parameter s' and the message M to the key-using signature generation apparatus 130 (step C5 in FIG. 5).

The second signing key generation part 1342 in the key-using signature generation apparatus 130 makes the value obtained by decoding a result of a bitwise exclusive OR of the first parameter s and the second parameter s':

$$t := s\,x \text{ or } s' \quad (74)$$

the second signing key x' (step B4 in FIG. 5).

$$x' \leftarrow \text{Decode}(t) \quad (75)$$

$$t = s\,x \text{ or } s' = [w_1\,x \text{ or } c_1, \ldots, w_n\,x \text{ or } c_n]\,x \text{ or } [w'_1\,x \text{ or } c'_1, \ldots, w'_n\,x \text{ or } c'_n] = [(w_1\,x \text{ or } c_1)\,x \text{ or } (w'_1\,x \text{ or } c'_1), \ldots, (w_n\,x \text{ or } c_n)\,x \text{ or } (w'_n\,x \text{ or } c'_n)] = [w_1\,x \text{ or } w'_1, \ldots, w_n\,x \text{ or } w'_n]\,x \text{ or } [c_1\,x \text{ or } c'_1, \ldots, c_n\,x \text{ or } c'_n] = (w\,x \text{ or } w')\,x \text{ or } (ENC(x)\,x \text{ or } ENC(\Delta)) \quad (76)$$

Because of using the linear code, Equation (76) becomes $$t = (w\,x \text{ or } w')x \text{ or } ENC(x\,x \text{ or } \Delta) \quad (77)$$

When a difference (Hamming distance) between the first biometric information w and the second biometric information w' is less than or equal to an error correction capability D of the linear code, a distance between the ENC(x xor Δ) and t is also less than or equal to D.

This is because it is $$ENC(x\,x \text{ or } \Delta)x \text{ or } t = ENC(x\,x \text{ or } \Delta)x \text{ or } ((w\,x \text{ or } w')x \text{ or } ENC(x\,x \text{ or } \Delta)) = w\,x \text{ or } w' \quad (78)$$

and the difference between ENC(x xor Δ) and t is equal to the difference between the first biometric information w and the second biometric information w' (Hamming distance).

Therefore, (x xor Δ) is reconstructed by executing a restoration algorithm Decode (t) from t where the difference from a code word ENC(x xor Δ) encoding (x xor Δ), is less than or equal to D.

$$x' = (x\,x \text{ or } \Delta) \leftarrow \text{Decode} \tag{79}$$

In other words, it can be confirmed that the second signing key x'=x xor Δ is correctly calculated from the bitwise exclusive OR operation of the first parameter s and the second parameter s'.

Figure 19A:
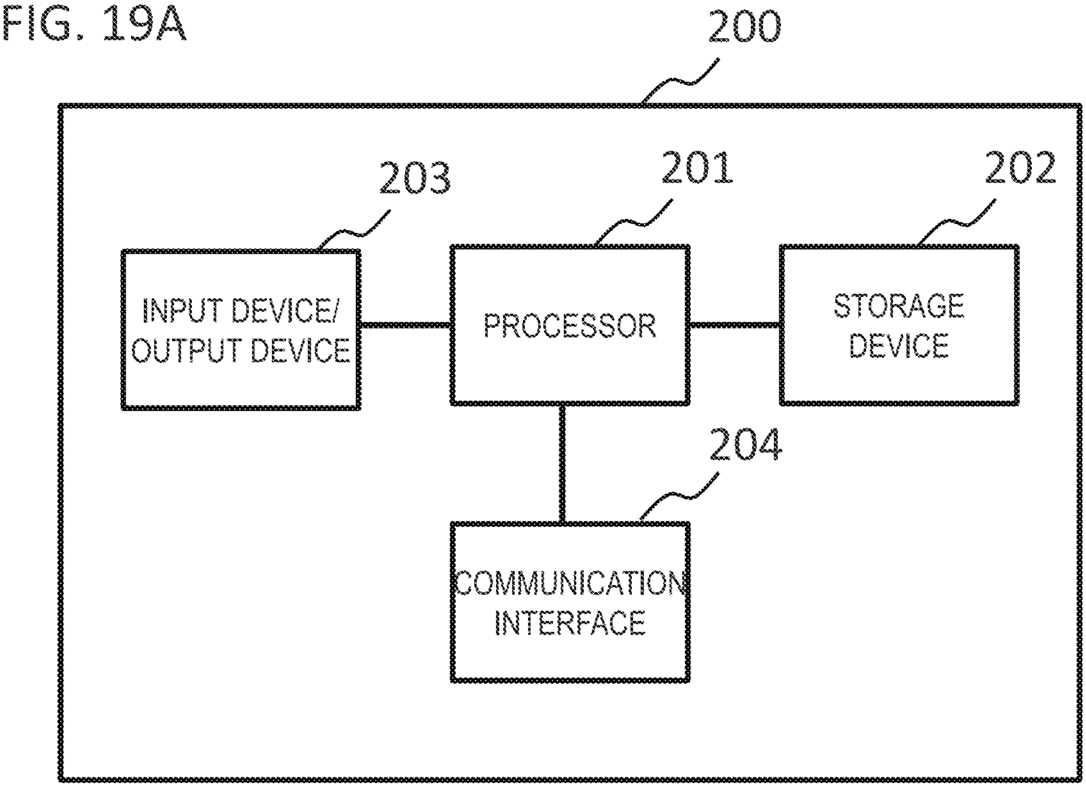
FIGS. 19A and 19B are diagrams illustrating examples of implementation on a computer.

FIG. 19A is a schematic diagram illustrating one of examples in which each apparatus (120, 130, 140, and 150) of the above digital signature system 100 is implemented on a computer that has communication functions and can be connected to each other via a network. In FIG. 19A, each apparatus (120, 130, 140, and 150) is provided with a processor 201, a storage device 202, an input device/output device 203, and a communication interface 204. Storage device 202 may be configured with a RAM (Random Access Memory), a ROM (Read Only Memory), or a semiconductor storage such as EEPROM (Electrically Erasable and Programmable ROM), HDD (Hard Disk Drive), CD (Compact Disc), DVD (Digital Versatile Disc), etc. a Disk Drive (HDD), a Compact Disc (CD), a Digital Versatile Disc (DVD), etc. The processor 201 executes programs (not shown) stored in the storage device 202 to realize processing and functions of each device. The input device/output device 203 may be configured with a keyboard and display. For example, the key-using signature generation apparatus 130 may be configured to display the verification results (acceptance or non-acceptance) from the verification apparatus 150 on an output device such as a display. In the key generation apparatus 120 and/or the biometrics-using signature generation apparatus 140, which acquire biometric information, the input device/output device 203 may be configured with a sensor to acquire biometric information. In this case, the sensor may be an image sensor (camera) if the biometric information is a face, iris, etc., a fingerprint sensor if the biometric information is a fingerprint, or a LED (Light Emitting Diode) that emits near-infrared light and a near-infrared camera that captures light transmitted through the finger, for example, in the case of finger veins. The sensor may be a removable sensor, such as a Universal Serial Bus (USB) device. Communication interface 204 may be provided with a network interface card, transceiver, etc., and may be configured to communicate with each other via LAN (Local Area Network), WAN (Wide Area Network) such as the Internet, wireless LAN, mobile communication network, etc. In the key generation apparatus 120, and/or the biometrics-using signature generation apparatus 140, the communication interface 204 may be configured to have an interface that communicates and connects to an external sensor (e.g., a sensor connected through Bluetooth (registered trademark), etc.) and receives biometric information acquired by the external sensor.

Figure 19B:
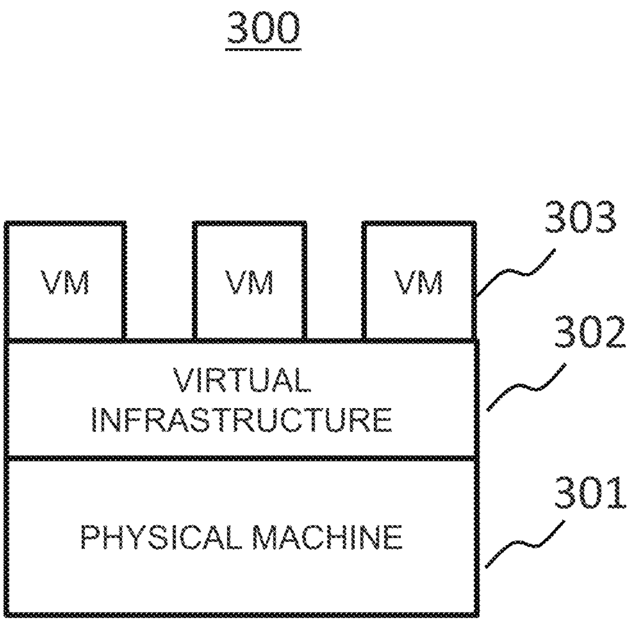

FIG. 19B schematically illustrates an example of implementing the apparatuses (120, 130, 140, and 150) in the digital signature system 100 described above as virtual machines using server virtualization technology. A plurality of virtual machines VMs run on a virtual infrastructure 302 such as a hypervisor implemented on a physical machine 301 of a server. One or more of the apparatuses in the digital signature system 100 (120, 130, 140, and 150) may be implemented as a virtual machine VM. It provides a virtual server environment with a plurality of servers running, although physically it is a single server. Each virtual machine VM is preferably configured to operate in an isolated environment in memory space. In this case, in the virtual machine VM, the program that realizes the processing of one of the apparatuses (120, 130, 140, and 150) runs on a virtual OS (Operating System) on the virtual machine. The virtual machine VM that virtually realizes any of the apparatuses (120, 130, 140, and 150) may be configured to communicate and connect with other virtual machines via a virtual network, or it may be configured to communicate and connect with other apparatus(es) among the apparatuses (120, 130, 140, and 150) through a physical interface (communication interface) of the physical machine 301 via a LAN, WAN such as the Internet, etc.

In the above example embodiments, a system for processing based on biometric information is described as an example, but this disclosure is not limited to biometric information and can also be realized using fuzzy information other than biometric information. For example, it may be applied to PUF (Physically Unclonable Function), etc. PUF is a physical duplication prevention function that identifies semiconductor devices (IC (Integrated Circuit) chip) and is a technology that uses individual differences that occur in the manufacturing process of IC chips, etc. to identify individuals (IC chips) like human fingerprints, for example With respect to equations (31), (40), etc., the use of a square lattice as the encoding is described as a non-limiting example, but it is of course possible to use RS codes, BCH codes, or other error-correcting codes as the encoding. In addition, biometric information is not limited to real number vectors, but integer vectors may also be used, as a matter of course.

The above examples of the disclosure can partially or entirely be described as following Supplementary notes (Notes), though not limited thereto.

(Note 1) A digital signature system, including a first signature generation apparatus that comprises at least a processor and a communication interface; and a second signature generation apparatus that includes at least a processor and a communication interface, wherein the first signature generation apparatus and the second signature generation apparatus are connected to communicate with each other.

The second signature generation apparatus is configured to perform processing including receiving a first parameter generated using at least first biometric information to store the first parameter in a storage of the second signature generation apparatus.

The first signature generation apparatus is configured to perform processing including generating a second parameter using at least second biometric information and transmits the second parameter to the second signature generation apparatus.

The second signature generation apparatus is configured to perform processing including generating a second signature for a message to be signed from the first parameter and the second parameter to transmit the second signature to the first signature generation apparatus.

The first signature generation apparatus is configured to perform processing including generating a first signature for the message based on at least the second signature to output the first signature.

(Note 2) In the digital signature system according to Note 1, the first signature generation apparatus generates the second parameter using the second biometric information and a differential key. The second signature generation apparatus generates a second signing key from the first parameter and the second parameter and generates the second signature for the message using the second signing key. The first signature generation apparatus generates the first signature when the message is singed with a first signing key using the differential key and the second signature.

(Note 3) In the digital signature system according to Note 1 or 2, the first parameter is one of a plurality of first parameters, wherein he second signature generation apparatus stores one or more of the first parameters in the storage, each associated with an ID (identifier) that identifies the first parameter, the first signature generation apparatus transmits the ID corresponding to the first parameter to be selected to the second signature generation apparatus, and the second signature generation apparatus obtains the first parameter corresponding to the ID transmitted from the first signature generation apparatus from the storage and generates the second signature for the message from the first parameter corresponding to the ID and the second parameter.

(Note 4) The digital signature system according to Note 1 or 2, further includes: a key generation apparatus, and a verification apparatus.

The key generation apparatus includes at least a processor and a communication interface and performs a processing including generating the first signing key and a verification key corresponding to the first signing key, obtaining the first biometric information, generating the first parameter using the first signing key and the first biometric information, and transmitting the first parameter to the second signature generation apparatus. a The verification apparatus includes at least processor and a communication interface and performs a processing including verifying the first signature for the message (correctness of a pair of the message and the first signature) using the verification key.

(Note 5) The digital signature system according to Note 3, further includes: a key generation apparatus, and a verification apparatus.

The key generation apparatus includes at least a processor and a communication interface and performs a processing including: generating the first signing key and a verification key corresponding to the first signing key, obtaining the first biometric information, generating the first parameter using the first signing key and the first biometric information, and transmitting the first parameter to the first signature generation apparatus.

The verification apparatus comprises at least a processor and a communication interface and performs a processing including verifying the first signature for the message (correctness of a pair of the message and the first signature) using the verification key. The first signing key is one of a plurality of first signing keys. The verification key is one of a plurality of verification keys.

The key generation apparatus generates a plurality of first parameters corresponding to a plurality of pairs of the first signing key and the verification key and transmits the plurality of first parameters to the second signature generation apparatus.

The first signature generation apparatus transmits the first signature and the message to the verification apparatus together with the ID, the first signature generated using at least a differential key and the second signature.

The verification apparatus receives the first signature, the message and the ID, obtains the verification key corresponding to the ID, and verifies the first signature for the message (correctness of a pair of the message and the first signature) using the verification key corresponding to the ID.

(Note 6) In the digital signature system according to any one of Notes 1 to 4, the first parameter is generated using an encoded key that encodes the first signing key, and the first biometric information.

(Note 7) In the digital signature system according to Note 5, the ID is a hash value of the verification key.

(Note 8) In the digital signature system according to Note 2 or 4, the first signature generation apparatus performs a processing including verifying the first signature for the message (correctness of a pair of the message and the first signature) using a verification key corresponding to the first signing key.

(Note 9) In the digital signature system according to any one of Notes 1 to 7, the second signature generation apparatus is configured to perform processing including calculating a difference between the first biometric information and the second biometric information using at least the first parameter and the second parameter, verifying whether or not the difference satisfies a predetermined specified condition, and terminating a process if the difference does not satisfy the specified condition.

(Note 10) In the digital signature system according to Note 9, the specified condition is that a norm of the difference between the first biometric information and the second biometric information is within a specified range.

(Note 11) In the digital signature system according to Note 10, the norm is $L^2$norm.

(Note 12) A digital signature method comprising:

receiving, by a second node, a first parameter generated using at least first biometric information to store the first parameter in a storage;

generating, by a first node, a second parameter using at least second biometric information to transmit, to the second node, the second parameter and a message to be signed;

generating, by the second node communicatively connecting with the first node, a second signature for the message using the first parameter and the second parameter to transmit the second signature to the first node; and generating, by a first node, a first signature for the message based on the second signature and outputting the first signature.

(Note 13) In the digital signature method according to Note 12, comprising generating, the first node, the second parameter using the second biometric information and a differential key;

generating, by the second node, a second signing key from the first parameter and the second parameter to generate the second signature for the message using the second signing key; and generating, by the first node, the first signature when the message is singed with a first signing key using the differential key and the second signature.

(Note 14) In the digital signature method according to Note 12, the first parameter is one of a plurality of first parameters. The method includes:

storing, by the second node, one or more of the first parameters in the storage, each associated with an ID (identifier) that identifies the first parameter;

transmitting, by the first node, the ID corresponding to the first parameter to be selected to the second node; and getting, by the second node, from the storage, the first parameter corresponding to the ID transmitted from the first node to generate the second signature for the message from the first parameter corresponding to the ID and the second parameter.

(Note 15) The digital signature method according to Note 13, further includes:

generating, by a third node, the first signing key and a verification key corresponding to the first signing key;

obtaining, by a third node, the first biometric information, and generating the first parameter using the first signing key and the first biometric information;

transmitting, by a third node, the first parameter to the second node; and verifying, by a fourth node, the first signature for the message (correctness of a pair of the message and the first signature) using the verification key.

(Note 16) The digital signature method according to Note 14, further includes:

generating, by a third node, the first signing key and a verification key corresponding to the first signing key;

obtaining, by the third node, the first biometric information; generating, by the third node, the first parameter using the first signing key and the first biometric information to transmit the first parameter to the first node; and verifying, by a fourth node, the first signature for the message (correctness of a pair of the message and the first signature) using the verification key, wherein the method includes:

generating, by the third node, a plurality of first parameters corresponding to a plurality of pairs of the first signing key and the verification key to transmit the plurality of first parameters to the second node;

transmitting, by the third node, the first signature and the message to the verification apparatus together with the ID by the first node, the first signature being generated using at least a differential key and the second signature;

receiving, by the fourth node, the first signature, the message and the ID, obtaining the verification key corresponding to the ID; and verifying, by the fourth node, the first signature for the message (correctness of a pair of the message and the first signature) using the verification key corresponding to the ID.

(Note 17) In the digital signature method according to any one of Notes 13 to 16, the first parameter is generated using an encoded key that encodes the first signing key, and the first biometric information.

(Note 18) In the digital signature method according to Note 14 or 15, the ID is a hash value of the verification key.

(Note 19) In the digital signature method according to any one of Notes 12 to 18, the first node verifies the first signature for the message (correctness of a pair of the message and the first signature) using a verification key corresponding to the first signing key.

(Note 20) The digital signature method according to any one of Notes 12 to 18, the second node calculates a difference between the first biometric information and the second biometric information using at least the first parameter and the second parameter, verifies whether or not the difference satisfies a predetermined specified condition, and terminates a process if the difference does not satisfy the specified condition.

(Note 21) In the digital signature method according to Note 20, the specified condition is that a norm of the difference between the first biometric information and the second biometric information is within a specified range.

(Note 22) In the digital signature method according to Note 21, the norm is $L^2$ norm.

(Note 23) A non-transitory computer-readable medium storing a program causing a first processing apparatus and a second processing apparatus, the first processing apparatus and the second processing apparatus being connected to communicate with each other, to execute processing including:

receiving, by the second processing apparatus, a first parameter generated using at least first biometric information to store the first parameter in a storage;

generating, by the first processing apparatus, a second parameter using a t least second biometric information to transmit, to the second processing apparatus, the second parameter and a message to be signed;

generating, by the second processing apparatus communicatively connecting with the first processing apparatus, a second signature for the message using the first parameter and the second parameter to transmit the second signature to the first processing apparatus; and generating, by the first processing apparatus, a first signature for the message based on the second signature to output the first signature.

The disclosure of each of PTLs 1 and 2, and NPLs 1 and 2 is incorporated herein by reference thereto. Variations and adjustments of the examples are possible within the scope of the overall disclosure (including the claims) based on the basic technical concept. Various combinations and selections of examples and disclosed elements (including the elements in each of the claims, examples, drawings, etc.) are possible within the scope of the claims of the present application. That is, the present disclosure includes various variations and modifications that could be made by those skilled in the art according to the overall disclosure including the claims and the technical concept.

What is claimed is:

1. A digital signature system, comprising:

a first signature generation apparatus that includes at least a processor and a communication interface; and a second signature generation apparatus that includes at least a processor and a communication interface, the first signature generation apparatus and the second signature generation apparatus communicatively connected to each other using communication interfaces thereof, wherein the second signature generation apparatus is configured to receive a first parameter generated using first biometric information and an encoded value of a first signing key to store the first parameter in a storage thereof, wherein the first signature generation apparatus is configured to:

acquire second biometric information;

generate a second parameter using the second biometric information and an encoded value of a differential key; and transmit the second parameter to the second signature generation apparatus, wherein the second signature generation apparatus is configured to:

receive the second parameter transmitted by the first signature generation apparatus;

decode a difference between the first parameter and the second parameter to obtain a second signing key;

generate a second signature for a message to be signed, using the second signing key;

transmit the second signature to the first signature generation apparatus, and wherein the first signature generation apparatus is configured to:

receive the second signature transmitted by the second signature generation apparatus; and generate a first signature for the message using a key homomorphic operation that takes, as input, the second signature and the differential key, the first signature being equivalent to a signature for the message generated with the first signing key if the first biometric information is same as or within a predetermined similarity range of the second biometric information, to output the first signature.

2. The digital signature system according to claim 1, wherein the second signature generation apparatus is configured to receive one or more of the first parameters to store the one or more of the first parameters in the storage thereof, each associated with an ID (identifier) uniquely identifying the first parameter, wherein the first signature generation apparatus is configured to transmit an ID corresponding to the first parameter to be selected to the second signature generation apparatus, and wherein the second signature generation apparatus is configured to get, from the storage, the first parameter corresponding to the ID received from the first signature generation apparatus to generate the second signature for the message using the first parameter corresponding to the ID and the second parameter.

3. The digital signature system according to claim 2, further comprising:

a key generation apparatus including at least a processor and a communication interface; and a verification apparatus including at least a processor and a communication interface, wherein the key generation apparatus is configured to:

generate the first signing key and a verification key corresponding to the first signing key;

obtain the first biometric information;

generate the first parameter using the first signing key and the first biometric information; and transmit the first parameter to the first signature generation apparatus, wherein the verification apparatus is configured to perform verification of the first signature for the message using the verification key, wherein the key generation apparatus is further configured to generate a plurality of the first parameters corresponding to a plurality of pairs of the first signing key and the verification key to transmit the plurality of first parameters to the second signature generation apparatus, and wherein the verification apparatus is further configured to:

receive the first signature, the message and the ID;

obtain the verification key corresponding to the ID, and perform verification of the first signature for the message using the verification key corresponding to the ID.

4. The digital signature system according to claim 3, wherein the ID is a hash value of the verification key.

5. The digital signature system according to claim 1, further comprising:

a key generation apparatus including at least a processor and a communication interface; and a verification apparatus including at least a processor and a communication interface, wherein the key generation apparatus is configured to:

generate the first signing key and a verification key corresponding to the first signing key;

obtain the first biometric information;

generate the first parameter using the first signing key and the first biometric information; and transmit the first parameter to the second signature generation apparatus, and wherein the verification apparatus is configured to perform verification of the first signature for the message using the verification key.

6. The digital signature system according to claim 5, wherein the key generation apparatus is configured to generate the first parameter by encoding the first signing key and combining the encoded value of the first signing key and the first biometric information.

7. The digital signature system according to claim 1, wherein the first signature generation apparatus verifies the first signature for the message, using a verification key corresponding to the first signing key.

8. The digital signature system according to claim 1, wherein the second signature generation apparatus is configured to:

calculate a difference between the first biometric information and the second biometric information using at least the first parameter and the second parameter;

verify whether or not the difference satisfies a predetermined specified condition; and terminate a process if the difference does not satisfy the predetermined specified condition.

9. The digital signature system according to claim 8, wherein the predetermined specified condition is that a norm of the difference between the first biometric information and the second biometric information is within a specified range.

10. The digital signature system according to claim 9, wherein the norm is $L^2$ norm.

11. A digital signature method comprising:

receiving, by a second node, a first parameter generated using first biometric information and an encoded value of a first signing key to store the first parameter in a storage;

acquiring, by a first node, second biometric information;

generating, by the first node, a second parameter using the second biometric information and an encoded value of a differential key to transmit, to the second node, the second parameter and a message to be signed;

decoding, by the second node communicatively connecting with the first node, a difference between the first parameter and the second parameter to obtain a second signing key;

generating, by the second node, a second signature for the message using the second signing key to transmit the second signature to the first node; and generating, by the first node, a first signature for the message using a key homomorphic operation that takes, as input, the second signature and the differential key, the first signature being equivalent to a signature for the message generated with the first signing key if the first biometric information is same as or within a predetermined similarity range of the second biometric information, to output the first signature.

12. The digital signature method according to claim 11, further comprising:

receiving, by the second node, one or more of the first parameters to store the one or more of the first parameters in the storage, each associated with an ID (identifier) uniquely identifying the first parameter;

transmitting, by the first node, an ID corresponding to the first parameter to be selected to the second node; and obtaining, by the second node, from the storage, the first parameter corresponding to the ID received from the first node to generate the second signature for the message using the first parameter corresponding to the ID and the second parameter.

13. The digital signature method according to claim 12, further comprising:

generating, by a third node, the first signing key and a verification key corresponding to the first signing key;

obtaining, by the third node, the first biometric information;

generating, by the third node, the first parameter using the first signing key and the first biometric information;

transmitting, by the third node, the first parameter to the first node;

verifying, by a fourth node, the first signature for the message using the verification key;

generating, by the third node, a plurality of the first parameters corresponding to a plurality of pairs of the first signing key and the verification key to transmit the plurality of first parameters to the second node;

receiving, by the fourth node, the first signature, the message and the ID;

obtaining, by the fourth node, the verification key corresponding to the ID; and verifying, by the fourth node, the first signature and the message using the verification key corresponding to the ID.

14. The digital signature method according to claim 11, further comprising:

generating, by a third node, the first signing key and a verification key corresponding to the first signing key;

obtaining, by the third node, the first biometric information;

generating, by the third node, the first parameter using the first signing key and the first biometric information;

transmitting, by the third node, the first parameter to the second node; and verifying, by a fourth node, the first signature for the message using the verification key.

15. A non-transitory computer-readable medium storing a program causing a first processing apparatus and a second processing apparatus, the first processing apparatus and the second processing apparatus communicatively connected to each other, to execute processing comprising:

receiving, by the second processing apparatus, a first parameter generated using first biometric information and an encoded value of a first signing key to store the first parameter in a storage;

acquiring, by the first processing apparatus, second biometric information;

generating, by the first processing apparatus, a second parameter using the second biometric information and an encoded value of a differential key to transmit, to the second processing apparatus, the second parameter and a message to be signed;

decoding, by the second processing apparatus, a difference between the first parameter and the second parameter to obtain a second signing key;

generating, by the second processing apparatus, a second signature for the message using the second signing key to transmit the second signature to the first processing apparatus; and generating, by the first processing apparatus, a first signature for the message using a key homomorphic operation that takes, as input, the second signature and the differential key, the first signature being equivalent to a signature for the message generated with the first signing key if the first biometric information is same as or within a predetermined similarity range of the second biometric information, to output the first signature.

16. The non-transitory computer-readable medium according to claim 15, storing the program causing the first processing apparatus and the second processing apparatus to execute processing comprising:

receiving, by the second processing apparatus, one or more of the first parameters to store the one or more of the first parameters in the storage, each associated with an ID (identifier) uniquely identifying the first parameter;

transmitting, by the first processing apparatus, an ID corresponding to the first parameter to be selected to the second processing apparatus;

obtaining, by the second processing apparatus, from the storage, the first parameter corresponding to the ID received from the first processing apparatus to generate the second signature for the message using the first parameter corresponding to the ID and the second parameter.

17. The non-transitory computer-readable medium according to claim 15, storing the program causing a third processing apparatus and a fourth processing apparatus to execute processing comprising:

generating, by the third processing apparatus, the first signing key and a verification key corresponding to the first signing key;

obtaining, by the third processing apparatus, the first biometric information;

generating, by the third processing apparatus, the first parameter using the first signing key and the first biometric information;

transmitting the first parameter to the second processing apparatus, by the third processing apparatus; and verifying, by the fourth processing apparatus, the first signature for the message using the verification key.

* * * * *